United States Patent
Ahn et al.

(10) Patent No.: US 11,249,716 B2
(45) Date of Patent: Feb. 15, 2022

(54) DISPLAY DEVICE AND METHOD FOR DRIVING THE SAME

(71) Applicant: Samsung Display Co. Ltd., Yongin-si (KR)

(72) Inventors: Yi Joon Ahn, Seoul (KR); Ga Na Kim, Icheon-si (KR); Byeong Hee Won, Incheon (KR); Jae Been Lee, Seoul (KR); Jae Woo Im, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 280 days.

(21) Appl. No.: 16/677,936

(22) Filed: Nov. 8, 2019

(65) Prior Publication Data
US 2020/0183637 A1    Jun. 11, 2020

(30) Foreign Application Priority Data

Dec. 11, 2018   (KR) .................. 10-2018-0159043
Feb. 12, 2019   (KR) .................. 10-2019-0016011

(51) Int. Cl.
*G10K 9/122*    (2006.01)
*G06F 3/16*     (2006.01)

(52) U.S. Cl.
CPC .............. *G06F 3/16* (2013.01); *G10K 9/122* (2013.01)

(58) Field of Classification Search
CPC .. G06F 3/16; G10K 9/122; G10K 9/13; H04S 2400/07; H04R 5/02; H04R 2499/15; H04R 7/10; H04R 17/00
See application file for complete search history.

(56) References Cited

U.S. PATENT DOCUMENTS

| | | | |
|---|---|---|---|
| 8,543,168 B2 * | 9/2013 | Zurek | H04R 7/18 455/566 |
| 2007/0202917 A1 * | 8/2007 | Phelps | H04R 7/045 455/556.1 |
| 2009/0216353 A1 | 8/2009 | Van Reck | |
| 2011/0235815 A1 | 9/2011 | Hiselius | |
| 2012/0028679 A1 * | 2/2012 | Ozasa | H04M 1/0266 455/556.1 |
| 2012/0191462 A1 | 7/2012 | Aok et al. | |
| 2015/0078588 A1 * | 3/2015 | Umehara | H04M 1/035 381/151 |
| 2016/0337757 A1 * | 11/2016 | Ozasa | H04R 17/005 |

* cited by examiner

*Primary Examiner* — Matthew A Eason
(74) *Attorney, Agent, or Firm* — Cantor Colburn LLP

(57) ABSTRACT

A display device includes a display panel which includes a first substrate, a second substrate, and a light emitting element layer disposed between the first substrate and the second substrate and outputting light to the second substrate, a first sound generator which is disposed on a surface of the first substrate and outputs sound by vibrating the display panel, and a first buffer member which is disposed on the surface of the first substrate, where a height of the first buffer member is smaller than that of the first sound generator.

30 Claims, 27 Drawing Sheets

FIG. 1
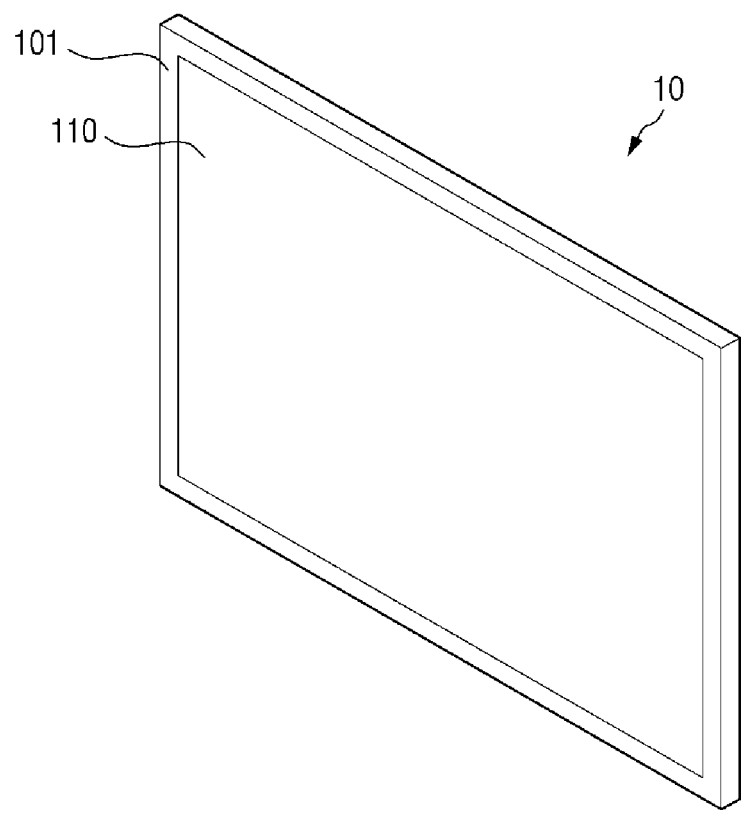
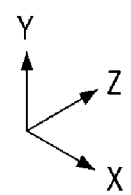

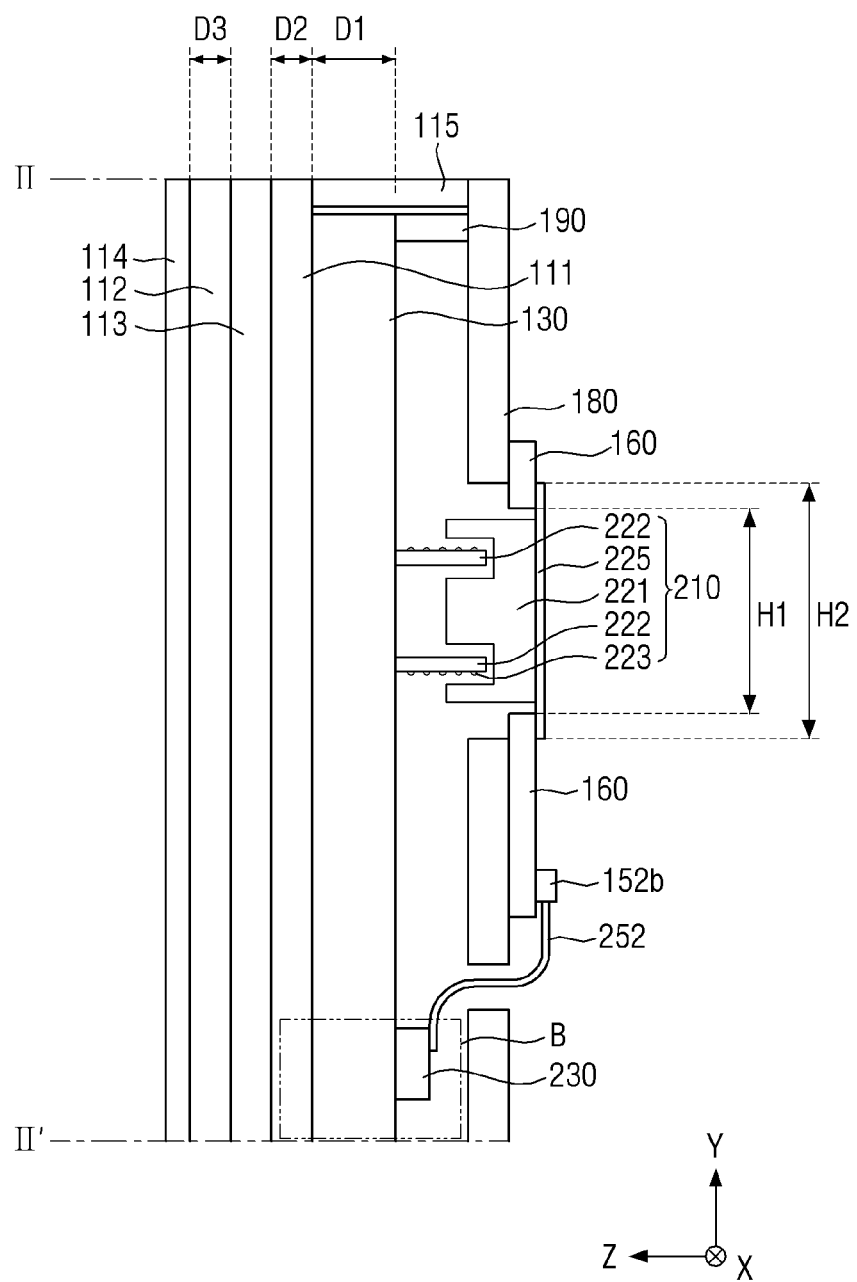

FIG. 11C
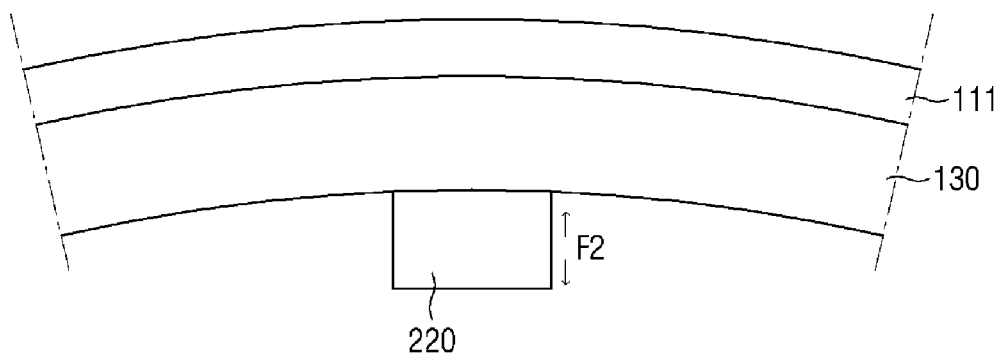
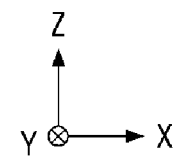

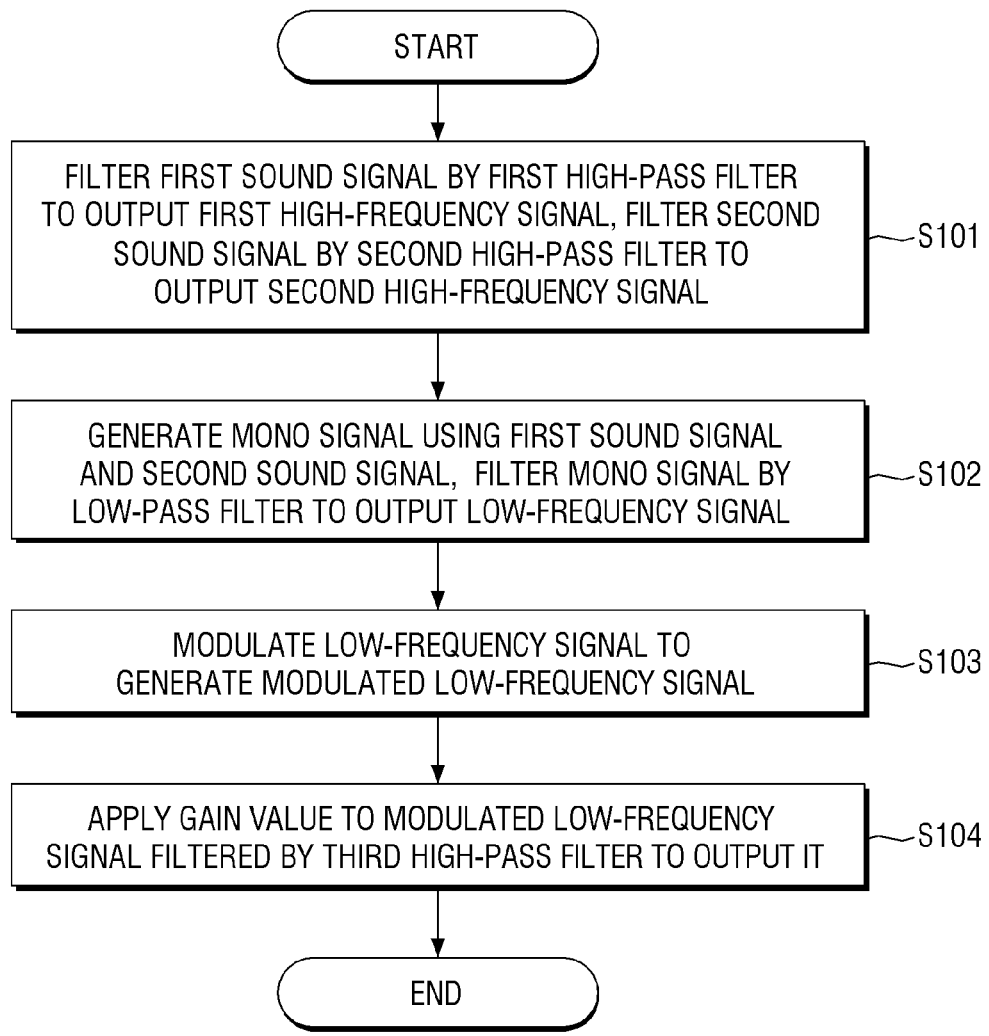

FIG. 15
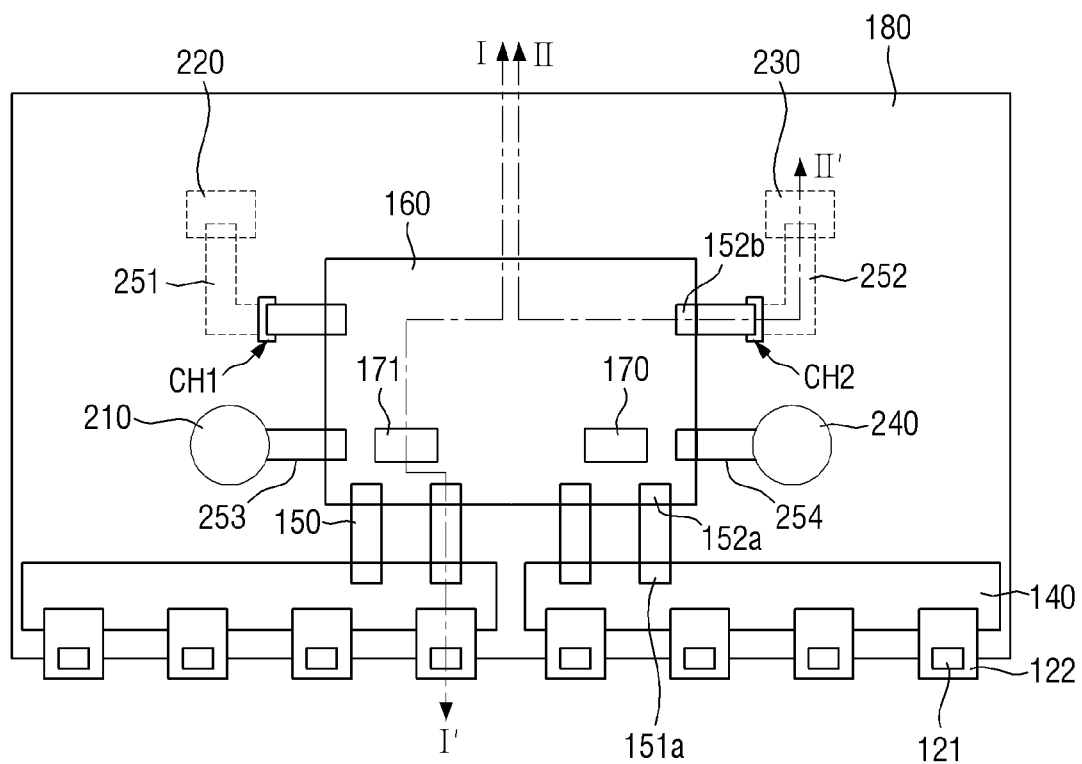
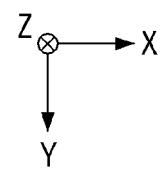

FIG. 16
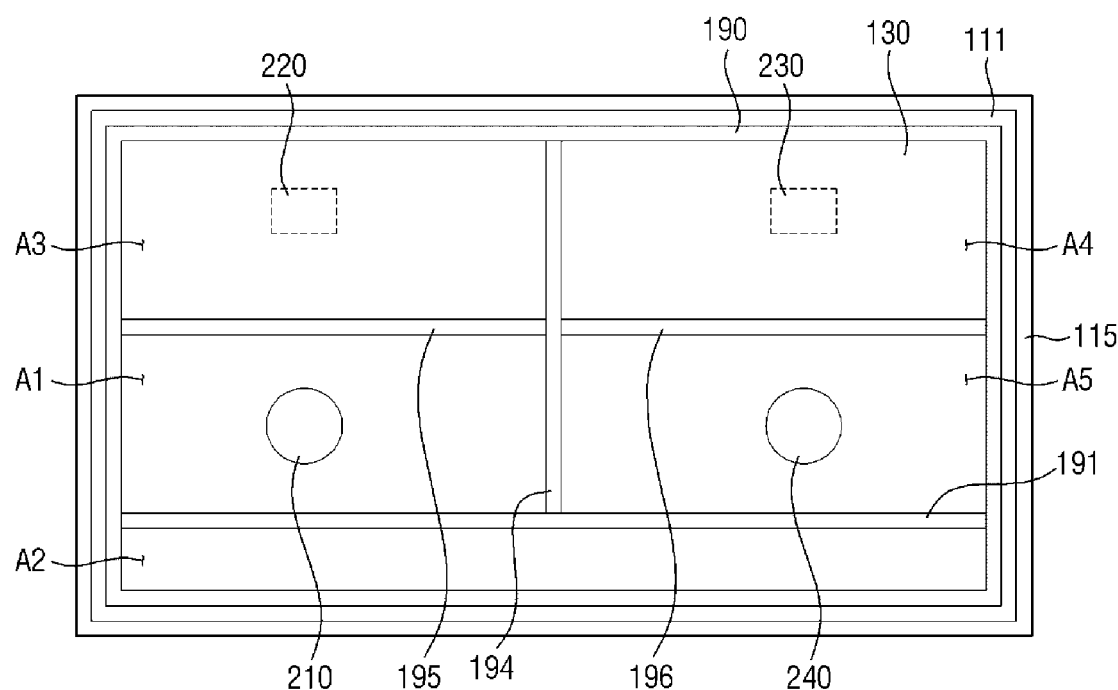
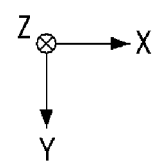

FIG. 19
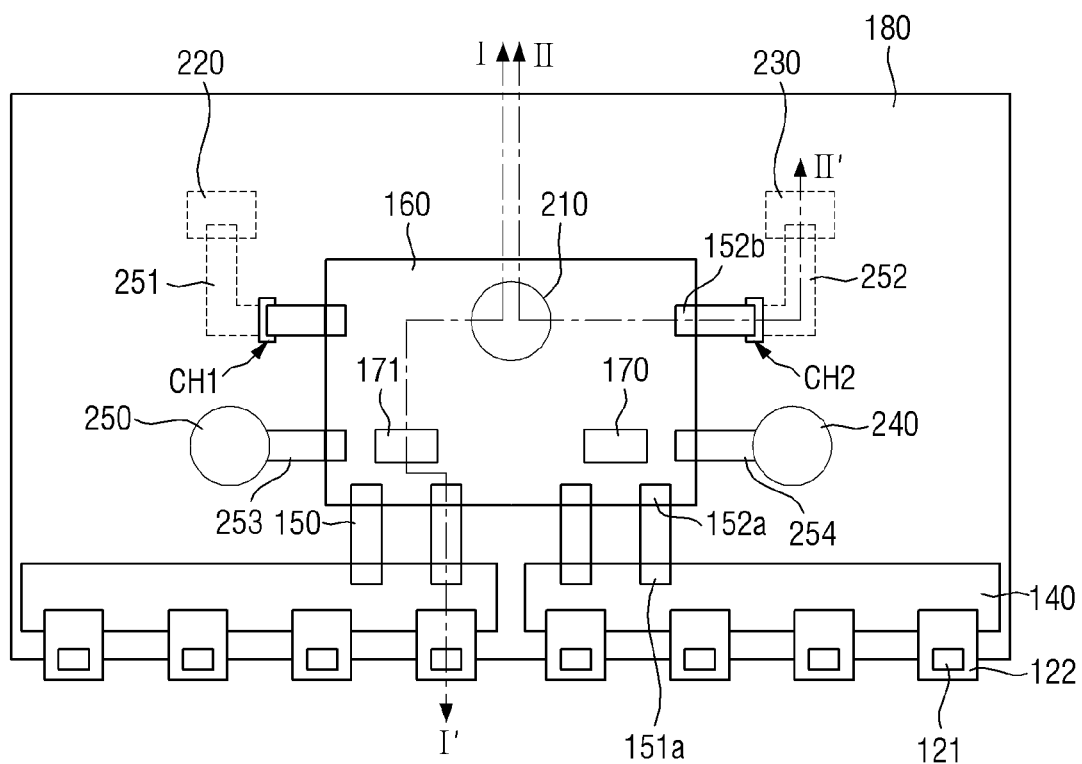
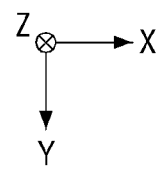

DISPLAY DEVICE AND METHOD FOR DRIVING THE SAME

This application claims priority to Korean Patent Application No. 10-2018-0159043 filed on Dec. 11, 2018 and No. 10-2019-0016011 filed on Feb. 12, 2019, and all the benefits accruing therefrom under 35 U.S.C. § 119, the content of which in their entirety is herein incorporated by reference.

BACKGROUND

1. Field

Exemplary embodiments of the invention relate to a display device and a method for driving the same.

2. Description of the Related Art

As an information-oriented society evolves, various demands for display devices are ever increasing. The display devices are being employed by a variety of electronic devices such as smart phones, digital cameras, laptop computers, navigation devices, monitors, and television sets. The display devices may be flat panel display devices such as a liquid-crystal display device, a field emission display device, an organic light-emitting display device and a quantum-dot light-emitting display device.

A display device may include a display panel for displaying an image and a sound generator for providing sound by vibrating the display panel. In order for the display device to output a low-frequency sound, a vibration displacement of the display panel should be increased. The vibration displacement of the display panel is proportional to a mass (or weight) of the sound generator, and the mass (or weight) of the sound generator may be increased with a cross-sectional area of the sound generator.

SUMMARY

In a small display device such as a smart phone, it is difficult to increase a cross-sectional area of a sound generator, which makes it difficult to increase a vibration displacement of a display panel. Accordingly, it is difficult to output low-frequency sound. In a middle- or large-sized display device such as a laptop computer, a monitor and a television ("TV"), it is possible to increase the cross-sectional area of the sound generator to increase the vibration displacement of the display panel. Accordingly, it is possible to output a low-frequency sound. However, in the middle- or large-sized display device, the vibration of the display panel may be visually recognized by a user when a low-frequency sound is output.

Exemplary embodiments of the invention provide a display device capable of providing a user with a low-frequency sound by a sound generator for generating sound by vibrating a display panel.

Exemplary embodiments of the invention also provide a method of driving a display device capable of providing a user with a low-frequency sound by a sound generator for generating sound by vibrating a display panel.

It should be noted that objects of the invention are not limited to the above-mentioned object, and other objects of the invention will be apparent to those skilled in the art from the following descriptions.

According to an exemplary embodiment of the invention, there is provided a display device including a display panel including a first substrate, a first sound generator which is disposed on a surface of the first substrate and vibrates the display panel according to a first sound signal to output a first sound, a second sound generator which is disposed on the surface of the first substrate and vibrates the display panel according to a second sound signal to generate a second sound in a higher frequency range than the first sound, and a sound driver circuit which generates the first sound signal and the second sound signal from a first stereo signal and outputs the first sound signal to the first sound generator and the second sound signal to the second sound generator, where a sound pressure level of a fundamental tone of the first sound is lower than a sound pressure level of a first harmonic tone of the first sound.

According to an exemplary embodiment of the invention, there is provided a method for driving a display device including filtering a sound signal in a first high-frequency range from a first stereo signal to output a first high-frequency signal, filtering a sound signal in the first high-frequency range from a second stereo signal to output a second high-frequency signal, generating a mono signal from the first stereo signal and the second stereo signal, filtering a sound signal in a low-frequency range from the mono signal to output a low-frequency signal, modulating the low-frequency signal so that a harmonic tone is generated based on a fundamental tone of the low-frequency signal to generate a modulated low-frequency signal, filtering a sound signal in the first high-frequency range from the modulated low-frequency signal, and applying a gain value to the modulated low-frequency signal filtered by a high-pass filter to output a gained modulated low-frequency signal.

The display devices according to the exemplary embodiments of the invention allow a user to feel as when she/he hears a low-frequency sound even when a fundamental tone having the lowest frequency is omitted, according to the psychology of sound. Therefore, it is possible to provide a user with low-frequency sounds even without increasing the area of the sound generators in a small display device. Further, in middle- or large-sized display devices, it is possible to provide a user with low-frequency sounds without recognizing the vibration of the display panel.

It should be noted that effects of the invention are not limited to those described above and other effects of the invention will be apparent to those skilled in the art from the following descriptions.

BRIEF DESCRIPTION OF THE DRAWINGS

The above and other exemplary embodiments and features of the invention will become more apparent by describing in detail exemplary embodiments thereof with reference to the attached drawings, in which:

FIG. 1 is a perspective view of an exemplary embodiment of a display device according to the invention.

FIG. 6 is a cross-sectional view taken along line II-II' of FIG. 3.

FIGS. 11B and 11C are side views showing an exemplary embodiment of vibration of the display panel by the second sound generator shown in FIG. 9.

FIG. 13 is a flowchart for illustrating an exemplary embodiment of a way of modulating a sound by the sound driver circuit of FIG. 6.

FIG. 15 is a view showing an exemplary embodiment of the bottom of a display device.

FIG. 16 is a view showing an exemplary embodiment of the blocking members, the first sound generator and the second sound generator when viewed from the bottom

FIG. 19 is a view showing an exemplary embodiment of the bottom of a display device.

DETAILED DESCRIPTION

Figure 2:
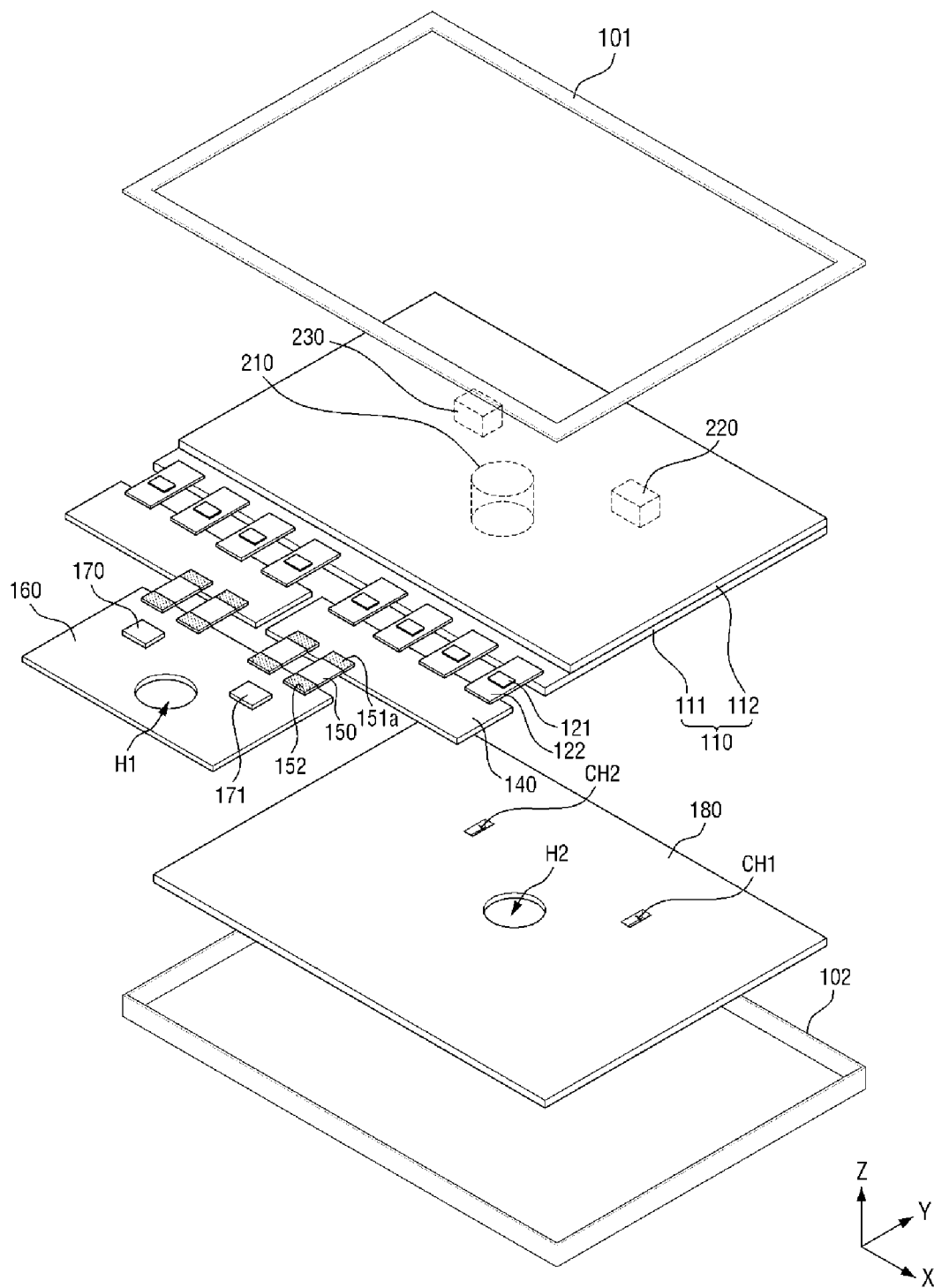
FIG. 2 is an exploded, perspective view of an exemplary embodiment of a display device according to the invention.

The invention will now be described more fully hereinafter with reference to the accompanying drawings, in which preferred embodiments of the invention are shown. This invention may, however, be embodied in different forms and should not be construed as limited to the exemplary embodiments set forth herein. Rather, these embodiments are provided so that this invention will be thorough and complete, and will fully convey the scope of the invention to those skilled in the art. The same reference numbers indicate the same components throughout the specification. In the attached drawing figures, the thickness of layers and regions is exaggerated for clarity.

It will also be understood that when a layer is referred to as being "on" another layer or substrate, it may be directly on the other layer or substrate, or intervening layers may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Hereinafter, embodiments of the invention will be described with reference to the attached drawings.

In the following description, an organic light-emitting display device using organic light-emitting elements is described as a display device according to an exemplary embodiment of the invention. It is, however, to be understood that the invention is not limited thereto. In an exemplary embodiment, the display device according to the exemplary embodiment of the invention may be an inorganic light-emitting display device using micro light-emitting diodes or an inorganic semiconductor (inorganic light-emitting diodes) as the light-emitting elements, for example.

FIG. 1 is a perspective view of a display device according to an exemplary embodiment of the invention. FIG. 2 is an exploded, perspective view of a display device according to an exemplary embodiment of the invention.

Referring to FIGS. 1 and 2, a display device 10 according to the exemplary embodiment of the invention includes a top set cover 101, a bottom set cover 102, a display panel 110, source driver circuits 121, flexible films 122, a heat-dissipation film 130, source circuit boards 140, cables 150, a control circuit board 160, a timing control circuit 170, and a bottom cover 180.

As used herein, the terms "above," "top" and "upper surface" refer to the side of the first substrate 111 of the display panel 110 facing the second substrate 112, i.e., the direction indicated by the arrow on the z-axis, whereas the terms "below," "bottom" and "lower surface" refer to the opposite side of the first substrate 111 of the display panel 110 facing the heat-dissipation film 130, i.e., the opposite direction to the direction indicated by the arrow on the z-axis. As used herein, the terms "left," "right," "upper" and "lower" sides indicate relative positions when the display panel 110 is viewed from the top. The "left side" refers to the direction indicated by the arrow on the x-axis, the "right side" refers to the opposite direction to the direction indicated by the arrow on the x-axis, the "upper side" refers to the direction indicated by the arrow on the y-axis, and the "lower side" refers to the opposite direction to the direction indicated by the arrow on the y-axis, for example.

The top set cover 101 and the bottom set cover 102 may be disposed to surround the borders of the display panel 110. The top set cover 101 and the bottom set cover 102 may cover the non-display area except for the display area of the display panel 110. Specifically, the top set cover 101 may cover the border of the upper surface of the display panel 110, and the bottom set cover 102 may cover the lower surface and the side surfaces of the display panel 110. The top set cover 101 and the bottom set cover 102 may be coupled with each other by a fixing member such as a screw or an adhesive member such as a double-sided tape and an adhesive. The top set cover 101 and the bottom set cover 102 may include plastic or metal, or may include both plastic and metal.

The display panel 110 may have a rectangular shape when viewed from the top. In an exemplary embodiment, the display panel 110 may have a rectangular shape having longer sides in a first direction (x-axis direction) and shorter sides in a second direction (y-axis direction) when viewed from the top as shown in FIG. 2, for example. The corners where the shorter sides in the first direction (x-axis direction) meet the longer sides in the second direction (y-axis direction) may be a right angle or may be rounded with a predetermined curvature. The shape of the display panel 110 when viewed from the top is not limited to a rectangular shape, but may be provided in a different polygonal shape, a circular shape, or an elliptical shape.

Although the display panel 110 is provided flat in FIG. 2, this is merely illustrative. The display panel 110 may be bendable at a predetermined curvature.

The display panel 110 may include a first substrate 111 and a second substrate 112. The first substrate 111 and the second substrate 112 may be either rigid or flexible. The first substrate 111 may include glass or plastic. The second substrate 112 may include glass, plastic, an encapsulation film, or a barrier film. In an exemplary embodiment, the plastic may include polyethersulphone ("PES"), polyacrylate ("PA"), polyacrylate ("PAR"), polyetherimide ("PEI"), polyethylenenapthalate ("PEN"), polyethyleneterepthalate ("PET"), polyphenylenesulfide ("PPS"), polyallylate, polyimide ("PI"), polycarbonate ("PC"), cellulosetriacetate ("CAT"), cellulose acetate propionate ("CAP"), or combinations thereof. The encapsulation film or the barrier film may be a stack of multiple inorganic layers.

The display panel 110 may include an interlayer 113 including a thin-film transistor ("TFT") layer TFTL, a emission material layer EML, a filler layer FL, and a light wavelength conversion layer QDL and a color filter layer CFL (refer to FIG. 7) disposed between the first substrate 111 and the second substrate 112. In the example, the first substrate 111 is a TFT substrate on which the TFT layer TFTL, the emission material layer EML and a thin-film encapsulation layer are disposed. The second substrate 112 is a color filter substrate on which the light wavelength conversion layer QDL and the color filter layer CFL are disposed. The filler layer FL may be disposed between the thin-film encapsulation layer of the first substrate and the light wavelength conversion layer QDL of the second substrate 112. The TFT layer TFTL, the emission material layer EML, the filler layer FL, the light wavelength conversion layer QDL and the color filter layer CFL of the display panel 110 will be described in detail later in conjunction with FIG. 7.

In an exemplary embodiment, a polarizing film 114 may be disposed on a surface of the second substrate 112 opposite to the surface of the second substrate 112 on which the interlayer 113 is disposed. The polarizing film 114 prevents the deterioration of visibility due to external light reflection. The polarizing film 114 may include a linear polarizer and a phase retardation film such as a quarter-wave plate. The phase retardation film may be disposed on the display panel 300, and the linear polarizer may be disposed on the phase retardation film.

In an alternative exemplary embodiment, the second substrate 112 of the display panel 110 may be eliminated, and the thin-film encapsulation layer may be disposed on the emission material layer EML. In such case, the filler layer FL may be eliminated, and the light wavelength conversion layer QDL and the color filter layer CFL may be disposed on the thin-film encapsulation layer.

One side of each of the flexible films 122 may be attached on one surface of the first substrate 111 of the display panel 110 while the other side of each of the flexible films 122 may be attached on one surface of the respective source circuit boards 140. Specifically, since the first substrate 111 is larger than the second substrate 112, one side of the first substrate 111 may not be covered by the second substrate 112 but is exposed. The flexible films 122 may be attached to the side of the first substrate 111 exposed without being covered by the second substrate 112. Each of the flexible films 122 may be attached to the surface of the first substrate 111 and the surface of the respective source circuit boards 140 using an anisotropic conductive film.

Figure 3:
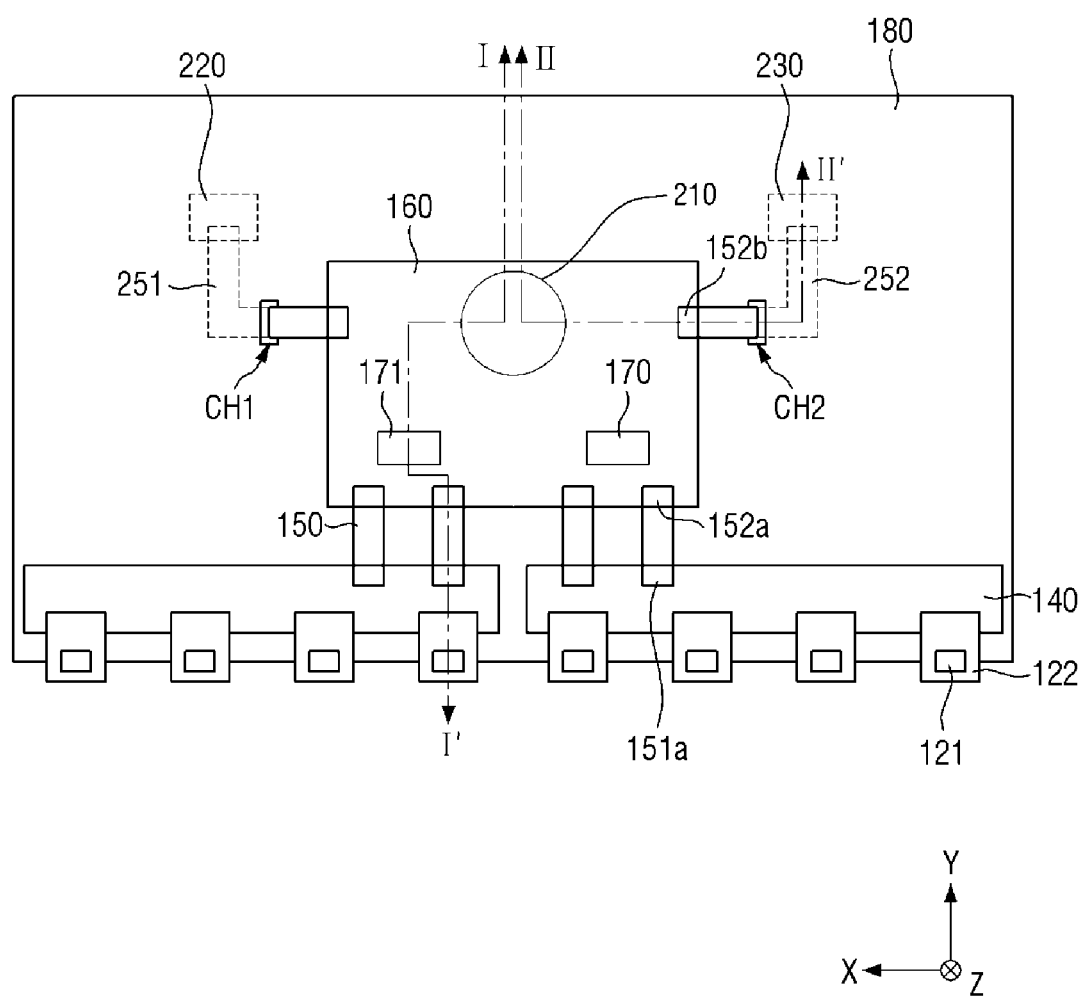
FIG. 3 is a view showing an exemplary embodiment of the bottom of a display device.

Each of the flexible films 122 may be a tape carrier package or a chip on film. Each of the flexible films 122 may be bent. Accordingly, the flexible films 122 may be bent below the first substrate 111 and toward an inner side as shown in FIGS. 3 and 5. Then, the source circuit boards 140, the cables 150 and the control circuit board 160 may be disposed on the lower surface of the heat-dissipation film 130.

Although FIG. 2 illustrates that the eight flexible films 122 are attached on the first substrate 111 of the display panel 110, the number of the flexible films 122 is not limited to eight.

The source driver circuits 121 each may be disposed on one surface of the respective flexible films 122. In an exemplary embodiment, each of the source driver circuits 121 may be implemented as an integrated circuit ("IC"). Each of the source driver circuits 121 converts digital video data into analog data voltages in accordance with a source control signal from the timing control circuit 170 and supplies the analog data voltages to data lines of the display panel 110 through the flexible films 122.

Each of the source circuit boards 140 may be connected to the control circuit board 160 via cables 150. To this end, each of the source circuit boards 140 may include 1A connectors 151a for connection to the cables 150. Each of the source circuit boards 140 may be a printed circuit board ("PCB") or a flexible PCB ("FPCB"). The cables 150 may be flexible cables.

The control circuit board 160 may be connected to the source circuit boards 140 via the cables 150. To this end, the control circuit board 160 may include second connectors 152 for connection to the cables 150. The control circuit board 160 may be a PCB or an FPCB.

Although the four cables 150 connect the source circuit boards 140 with the control circuit board 160 in the example shown in FIG. 2, the number of the cables 150 is not limited to four. In addition, although the two source circuit boards 140 are shown in FIG. 2, the number of the source circuit boards 140 is not limited two.

In an alternative exemplary embodiment, when there are a small number of the flexible films 122, the source circuit boards 140 may be eliminated. In such case, the flexible films 122 may be directly connected to the control circuit board 160.

The timing control circuit 170 may be disposed on one surface of the control circuit board 160. In an exemplary embodiment, the timing control circuit 170 may be implemented as an IC. The timing control circuit 170 may receive digital video data and timing signals from a system-on-chip ("SOC") of a system circuit board and may generate a source control signal for controlling the timing of the source driver circuits 121 according to the timing signals.

A sound driver circuit 171 may be disposed on one surface of the control circuit board 160. In an exemplary embodiment, the sound driver circuit 171 may be implemented as an IC. The sound driver circuit 171 may receive sound signals from the SOC of the system circuit board and may generate a first sound signal, a second sound signal and a third sound signal depending on the sound signals. The sound driver circuit 171 may output the first sound signal to a first sound generator 210, the second sound signal to a second sound generator 220, and the third sound signal to a third sound generator 230.

In an exemplary embodiment, the SOC may be disposed (e.g., mounted) on the system circuit board connected to the control circuit board 160 via another flexible cable and may be implemented as an IC. In an exemplary embodiment, the SOC may be a processor of a smart television ("TV"), a central processing unit ("CPU") or a graphics card of a computer or a laptop computer, or an application processor of a smartphone or tablet personal computer ("PC"). The system circuit board may be a PCB or an FPCB.

A power supply circuit may be further attached on one surface of the control circuit board 160. The power supply circuit may generate voltages desired for driving the display panel 110 from a main power source applied from the system circuit board and may supply the voltages to the display panel 110. In an exemplary embodiment, the power supply circuit may generate a high-potential voltage, a low-potential voltage, and an initialization voltage for driving the organic light-emitting elements and may supply the generated voltages to the display panel 110. In addition, the power supply circuit may generate and supply driving voltages for driving the source driver circuits 121, the timing control circuit 170, etc. In an exemplary embodiment, the power supply circuit may be implemented as an IC. In an alternative exemplary embodiment, the power supply circuit may be disposed on a power supply circuit board provided separately from the control circuit board 160. The power circuit board may be a PCB or an FPCB.

The heat-dissipation film 130 may be disposed on one surface of the first substrate 111 that does not face the second substrate 112, i.e., on the lower surface of the first substrate 111. In such case, on one surface of the heat-dissipation film 130 that does not face the first substrate 111, i.e., on the lower surface of the heat-dissipation film 130, the first sound generator 210, the second sound generator 220 and the third sound generator 230 may be disposed. The heat-dissipation film 130 serves to dissipate heat generated by the first, second and third sound generators 210, 220, and 230. To this end, the heat-dissipation film 130 may include a metal layer such as graphite, silver (Ag), copper (Cu) and aluminum (Al) having a high thermal conductivity.

The heat-dissipation film 130 may include a plurality of graphite layers or a plurality of metal layers provided in a first direction (x-axis direction) and a second direction (y-axis direction) instead of the third direction (z-axis direction). In such case, the heat generated by the first, second and third sound generators 210, 220 and 230 may spread in the first direction (x-axis direction) and the second direction (y-axis direction), so that it may be released more effectively. As used herein, the first direction (x-axis direction) may be the width direction (or the horizontal direction) of the display panel 110, the second direction (y-axis direction) may be the height direction (or the vertical direction) of the display panel 110, and the third direction (z-axis direction) may be the thickness direction of the display panel 110. Accordingly, it is possible to prevent the heat generated by the first sound generator 210, the second sound generator 220 and the third sound generator 230 from affecting the display panel 110 by virtue of the heat-dissipation film 130.

In order to prevent the heat generated by the first sound generator 210, the second sound generator 220 and the third sound generator 230 from affecting the display panel 110, the thickness D1 of the heat-dissipation film 130 may be larger than the thickness D2 of the first substrate 111 and the thickness D3 of the second substrate 112.

The heat-dissipation film 130 may be smaller than the first substrate 111 so that the edge of one surface of the first substrate 111 may be exposed without being covered by the heat-dissipation film 130.

In another exemplary embodiment, the heat-dissipation film 130 may be eliminated. Then, the elements disposed on the surface of the heat-dissipation film 130 may be disposed on one surface of the first substrate 111.

The first sound generator 210, the second sound generator 220 and the third sound generator 230 may be disposed on one surface of the first substrate 111 or one surface of the heat-dissipation film 130. The first sound generator 210, the second sound generator 220 and the third sound generator 230 may be vibrating devices capable of vibrating the display panel 110 in the third direction (z-axis direction). In such case, the display panel 110 may serve as a diaphragm for outputting sound.

Figure 8:
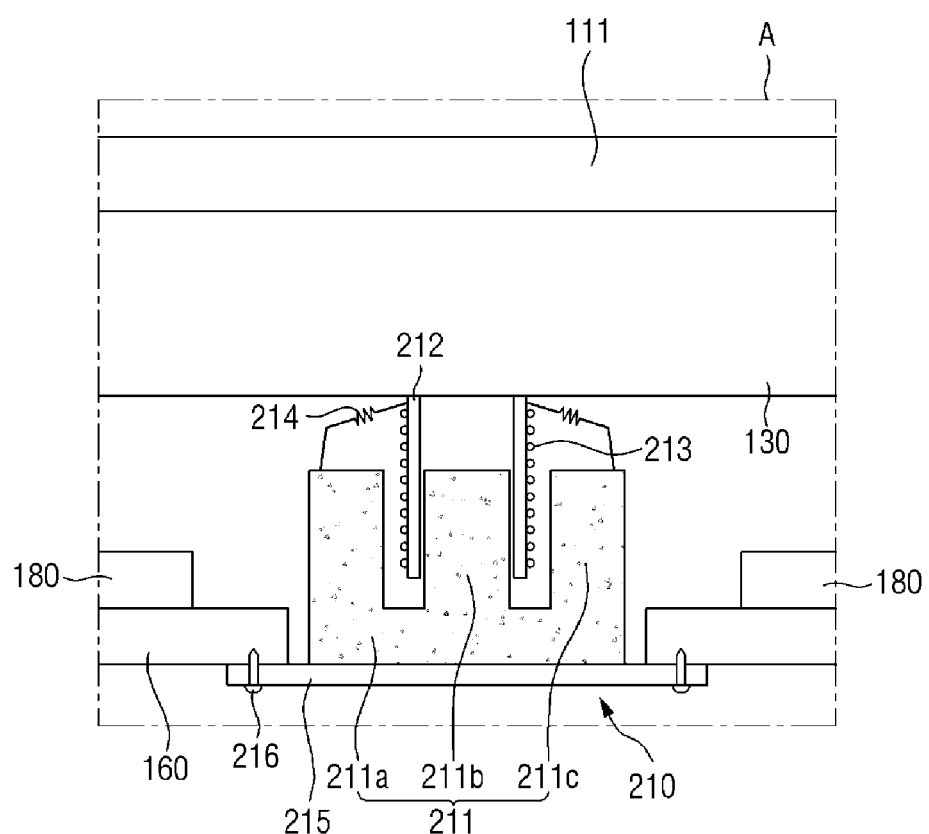
FIG. 8 is a cross-sectional view showing an exemplary embodiment of the first sound generator of FIGS. 5A and 5B.
Figure 9A:
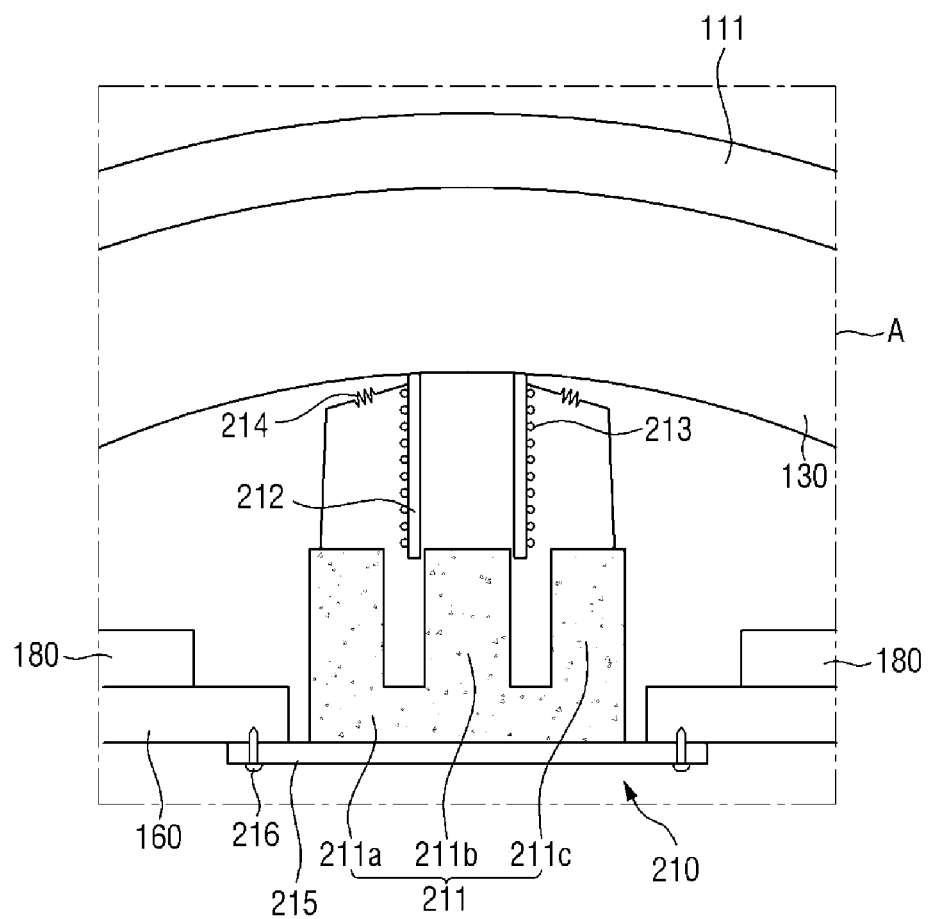
FIGS. 9A and 9B are views showing an exemplary embodiment of vibration of the display panel by the first sound generator shown in FIG. 7.
Figure 9B:
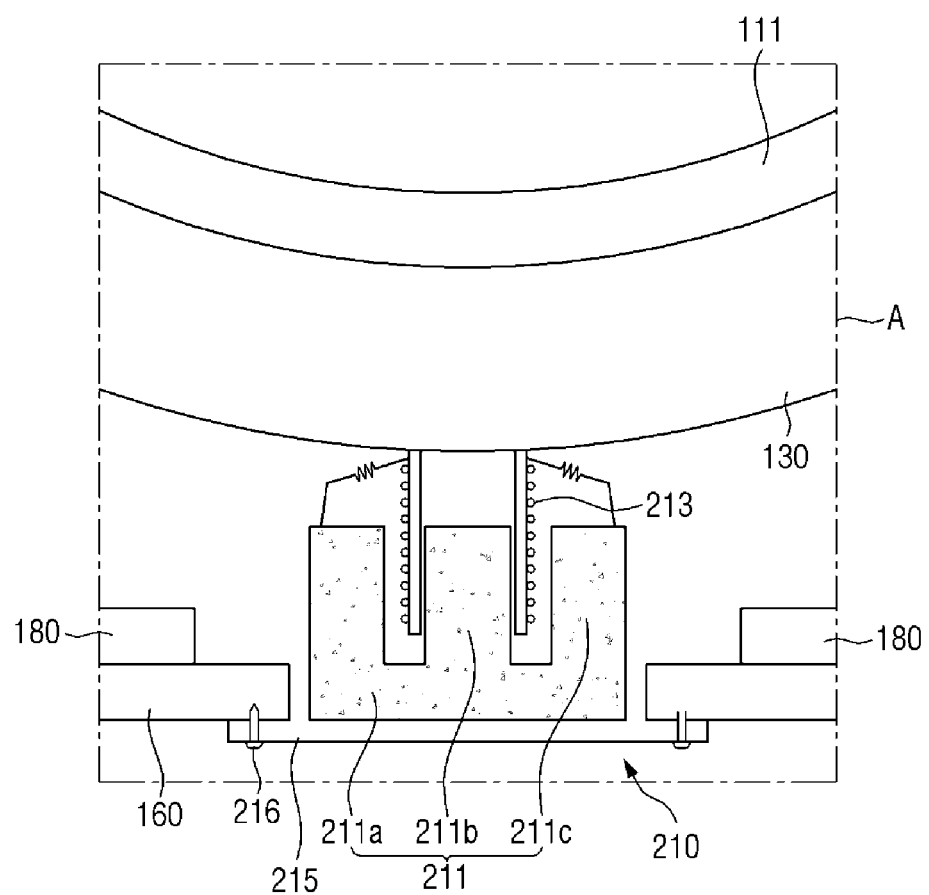

Specifically, the first sound generator 210 may be an exciter for vibrating the display panel 110 by generating a magnetic force using a voice coil as shown in FIGS. 8, 9A and 9B. Each of second sound generator 220 and the third sound generator 230 may be a piezoelectric element or a piezoelectric actuator which vibrates the display panel 110 using a piezoelectric material that contracts or expands according to the applied voltage as shown in FIGS. 10 and 11A to 11C.

The first sound generator 210 may serve as a low-frequency sound generator for outputting a first sound of a low-frequency range, while the second sound generator 220 may serve as a high-frequency sound generator for outputting a second sound of a high-frequency range. The third sound generator 230 may serve as a high-frequency sound generator for outputting a third sound of a high-frequency range. Therefore, the display device 10 may provide a user with a high-quality sound including both the low-frequency range and the high-frequency range by outputting a sound of a low-frequency range using the first sound generator 210 and outputting a sound of a high-frequency range using the second sound generator 220 and the third sound generator 230.

In addition, the display device 10 may use the first sound generator 210 to vibrate the display panel 110 to output a sound in a low-frequency range, may use the second sound generator 220 to vibrate the display panel 110 to output a sound in a high-frequency range from the right side, and may use the third sound generator 230 to vibrate the display panel 110 to output a sound in a high-frequency range from the left side. In such case, the display device 10 may output 2.1 channel stereo sounds and thus may provide a user with high quality sound.

Figure 4:
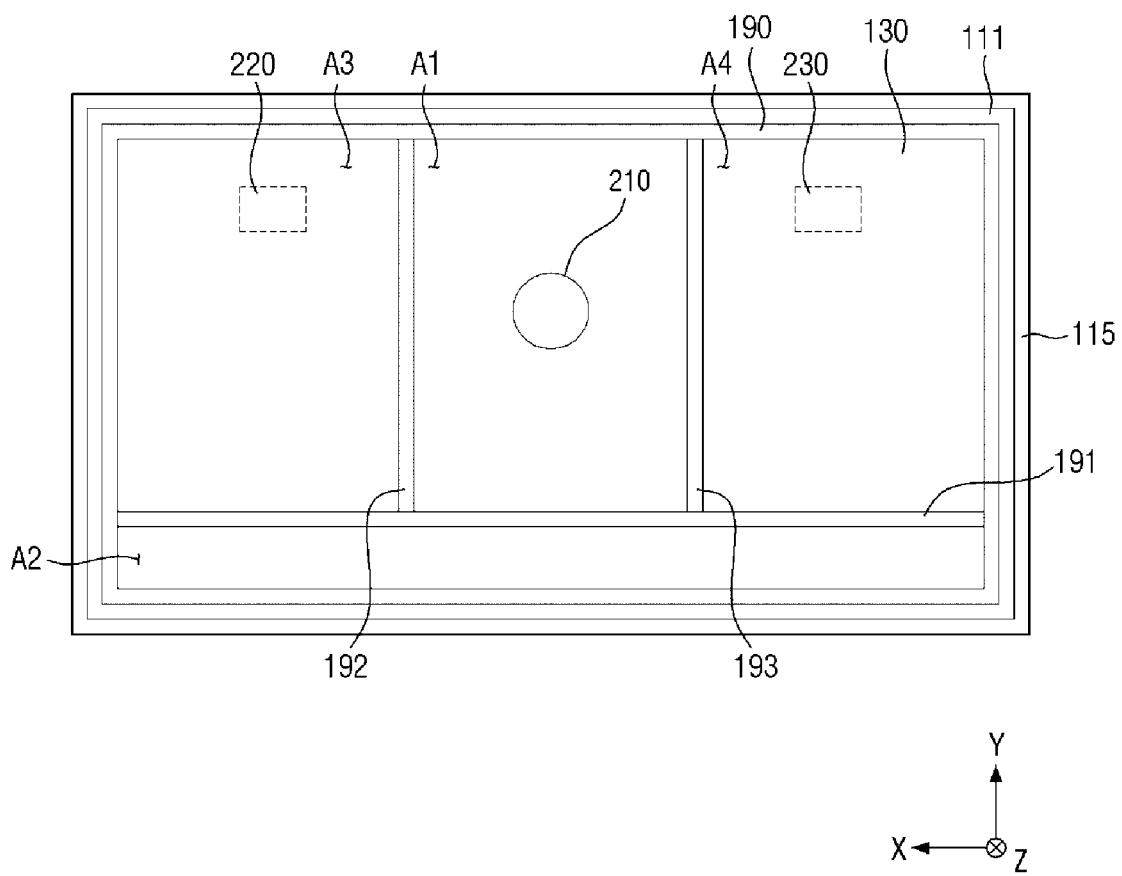
FIG. 4 is a view showing an exemplary embodiment of the blocking members, the first sound generator and the second sound generator when viewed from the bottom.

In FIG. 2, the display device 10 includes three sound generators 210, 220 and 230. It is, however, to be understood that the number of the sound generators 200 is not limited to three. The display device 10 may include four sound generators 210, 220 230 and 240 as shown in FIG. 4, or may include five sound generators 210, 220, 230, 240 and 250 as shown in FIG. 19. In an alternative exemplary embodiment, the display device 10 may include six or more sound generators.

In the following description, the first sound generator 210 is an exciter while the second sound generator 220 and the third sound generator 230 are piezoelectric elements or piezoelectric actuators. It is, however, to be understood that the invention is not limited thereto. The first sound generator 210, the second sound generator 220, and the third sound generator 230 may all be exciters, piezoelectric elements, or piezoelectric actuators.

The bottom cover 180 may be disposed on one surface of the heat-dissipation film 130. The bottom cover 180 may be attached to the border of one surface of the first substrate 111 of the display panel 110 by a first adhesive member 115. The first adhesive member 115 may be a double-sided tape including a buffer layer such as foam. The bottom cover 180 may be metal or tempered glass.

As described above, according to the display device 10 shown in FIGS. 1 and 2, the display panel 110 is used as a diaphragm by the first sound generator 210, the second sound generator 220 and the third sound generator 230 to output sound. Accordingly, it is possible to output the sound toward the front face of the display device 10, thereby improving the sound quality. In addition, due to the first sound generator 210, the second sound generator 220 and the third sound generator 230, a separate speaker otherwise disposed on the lower surface or one surface of an existing display panel 110 may be eliminated.

It should be noted that although the display device 10 according to the exemplary embodiment of the invention shown in FIGS. 1 and 2 is a middle- or large-sized display device including the plurality of source driver circuits 121, this is merely illustrative. That is to say, the display device 10 according to the exemplary embodiment of the invention may be a small-sized display device including a single source driver circuit 121. In such case, the flexible films 122 and the source circuit boards 140 and the cables 150 may be eliminated. The source driver circuit 121 and the timing control circuit 170 may be integrated into a single integrated circuit to be attached onto a single flexible circuit board or to be attached onto the first substrate 111 of the display panel 110. Examples of the middle- or large-sized display devices include monitors and television sets, and examples of small-sized display devices include smart phones and tablet PCs.

Figure 5A:
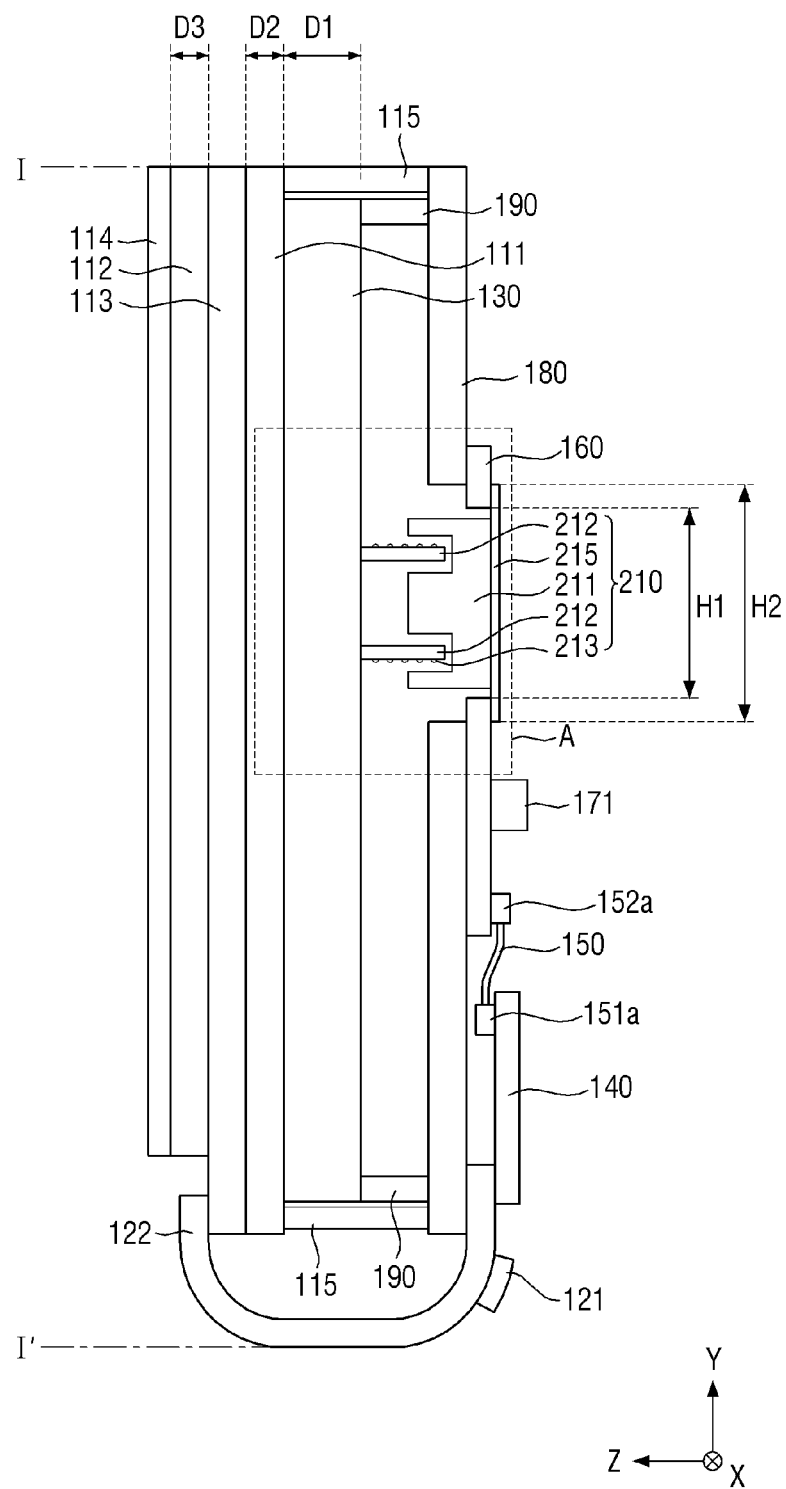
FIG. 5A is a cross-sectional view taken along line I-I' of FIG. 3.
Figure 5B:
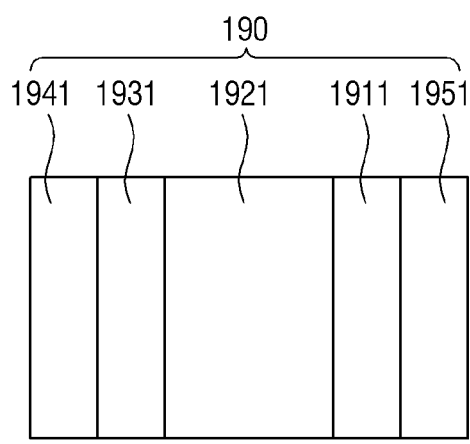
FIG. 5B is an enlarged view of a blocking member of FIG. 5A.

FIG. 3 is a view showing an exemplary embodiment of the bottom of a display device. FIG. 4 is a view showing an exemplary embodiment of the blocking members, the first sound generator and the second sound generator when viewed from the bottom. FIG. 5A is a cross-sectional view taken along line I-I' of FIG. 3, and FIG. 5B is an enlarged view of a blocking member of FIG. 5A. FIG. 6 is a cross-sectional view taken along line II-II' of FIG. 3.

For convenience of illustration, FIG. 4 only shows the first substrate 111, the first adhesive member 115, the heat-dissipation film 130, the blocking members 190, 191, 192 and 193, the first sound generator 210, the second sound generator 220 and the third sound generator 230 of the display panel 110.

Referring to FIGS. 3 to 6, the flexible films 122 may be bent to the bottom of the heat-dissipation film 130, such that the source circuit board 140 may be disposed on one surface of the heat-dissipation film 130.

The flexible films 122 are bent to the bottom of the bottom cover 180 and may be attached to the source circuit board 140 on the surface of the bottom cover 180. The source circuit board 140 and the control circuit board 160 are disposed on one surface of the bottom cover 180 and may be connected to one another through the cables 150.

The first sound generator 210 may be disposed closer to the center of the display panel 110 than the second sound generator 220 and the third sound generator 230 are. The second sound generator 220 may be disposed closer to one side of the display panel 110, for example, to the right side of the display panel 110, than the third sound generator 230 is. The third sound generator 230 may be disposed closer to one side of the display panel 110, for example, to the left side of the display panel 110, than the second sound generator 220 is.

The first sound generator 210 may include a magnet 211, a bobbin 212, a voice coil 213 and a lower plate 215, and a magnet 221, a bobbin 222, a voice coil 223 and a lower plate 225 as shown in FIGS. 5 and 6. The bobbin 212 may be attached to one surface of the heat-dissipation film 130 by an adhesive member such as a double-sided adhesive. The voice coil 213 may be wound around the outer circumferential surface of the bobbin 212. Since the bobbin 212 is provided in a cylindrical shape, the central projection of the magnet 211 may be disposed inside the bobbin 212, and the side walls of the magnet 211 may be disposed outside the bobbin 212. The lower plate 215 may be disposed on the lower surface of the magnet 211. The lower plate 215 may be fixed on one surface of the control circuit board 160 by a fixing member 216 such as a screw.

The magnet 211 may be disposed in a hole H1 defined in the control circuit board 160 and a hole H2 defined in the bottom cover 180. The control circuit board 160 is fixed on one surface of the bottom cover 180 by a fixing member such as a screw, and thus the hole H1 of the control circuit board 160 may be smaller than the hole H2 of the bottom cover 180.

The bobbin 212 of the first sound generator 210 may be fixed on one surface of the heat-dissipation film 130, and the magnet 211 may be fixed to the control circuit board 160. Therefore, the bobbin 212, on which the voice coil 213 is wound, may reciprocate in the third direction (z-axis direction) according to the applied magnetic field generated around the voice coil 213, such that the display panel 110 may vibrate. The first sound generator 210 will be described in detail with reference to FIGS. 8, 9A and 9B.

Each of the second sound generator 220 and the third sound generator 230 may be attached on one surface of the heat-dissipation film 130 by an adhesive member such as a pressure sensitive adhesive. The second sound generator 220 may be connected to a 2B connector 152b of the control circuit board 160 by a first sound circuit board 251. The third sound generator 230 may be connected to another 2B connector 152b of the control circuit board 160 by a second sound circuit board 252. A first pad and a second pad connected to a first electrode and a second electrode, respectively, disposed on a surface of the second sound generator 220 or the third sound generator 230 may be disposed on one side of each of the first sound circuit board 251 and the second sound circuit board 252. A connection portion for connecting to the 2B connector 152b of the control circuit board 160 may be disposed on the other side of each of the first sound circuit board 251 and the second sound circuit board 252. That is to say, the second sound generator 220 may be electrically connected to the control circuit board 160 by the first sound circuit board 251, and the third sound generator 230 may be electrically connected to the control circuit board 160 by the second sound circuit board 252. Each of the first sound circuit board 251 and the second sound circuit board 252 may be an FPCB or a flexible cable.

The timing control circuit 170 and the sound driver circuit 171 may be disposed on the control circuit board 160. The sound driver circuit 171 may be disposed on a circuit board other than the control circuit board 160. In an exemplary embodiment, the sound driver circuit 171 may be disposed on a system circuit board, a power circuit board, or a sound circuit board, for example. The sound circuit board refers to a circuit board on which only the sound driver circuit 171 is disposed without other integrated circuits.

In an exemplary embodiment, the sound driver circuit 171 may include a digital signal processor ("DSP") for digitally processing sound signals, a digital-to-analog converter ("DAC") for converting the digital signal processed in the DSP into driving voltages in the form of an analog signal, an amplifier ("AMP") for amplifying and outputting the analog driving voltages converted by the DAC, etc., for example.

The sound driver circuit 171 may generate a first sound signal which includes a 1A driving voltage and a 1B driving voltage for driving the first sound generator 210 according to the sound signals. The sound driver circuit 171 may generate a second sound signal which includes a 2A driving voltage and a 2B driving voltage for driving the second sound generator 220 according to the sound signals. The sound driver circuit 171 may generate a third sound signal which includes a 3A driving voltage and a 3B driving voltage for driving the third sound generator 230 according to the sound signals. A method of generating the first sound signal, the second sound signal and the third sound signal of the sound driver circuit 171 will be described later with reference to FIG. 12.

The first sound generator 210 may receive the first sound signal including the 1A driving voltage and the 1B driving voltage from the sound driver circuit 171. The first sound generator 210 may output sound by vibrating the display panel 110 according to the 1A driving voltage and the 1B driving voltage. When the lower plate 215 of the first sound generator 210 is disposed on the control circuit board 160, one end and the other end of the voice coil 213 of the first sound generator 210 may be extended to the control circuit board 160 to be connected to the metal lines of the control circuit board 160.

The second sound generator 220 may receive a second sound signal including a 2A driving voltage and a 2B driving voltage from the sound driver circuit 171. The second sound generator 220 may output sound by vibrating the display panel 110 according to the 2A driving voltage and the 2B driving voltage. The second sound signal from the sound driver circuit 171 may be transmitted to the second sound generator 220 via the cable 150, the source circuit board 140 and the first sound circuit board 251.

The third sound generator 230 may receive a third sound signal including a 3A driving voltage and a 3B driving voltage from the sound driver circuit 171. The third sound generator 230 may output sound by vibrating the display panel 110 according to the 3A driving voltage and the 3B driving voltage. The third sound signal from the sound driver circuit 171 may be transmitted to the third sound generator 230 via the cable 150, the source circuit board 140 and the second sound circuit board 252.

The sound driver circuit 171 may be disposed on the control circuit board 160, and the second sound generator 220 and the third sound generator 230 may be disposed on one surface of the heat-dissipation film 130, as shown in FIGS. 4 and 6. In such case, the first sound circuit board 251 connected to the second sound generator 220 may be connected to the 2B connector 152b of the control circuit board 160 through a first cable hole CH1 passing through the bottom cover 180. In addition, the second sound circuit board 252 connected to the third sound generator 230 may be connected to the 2B connector 152b of the control circuit board 160 through a second cable hole CH2 passing through the bottom cover 180. The first cable hole CH1 may be defined between one side of the control circuit board 160 and the second sound generator 220 when viewed from the top. The second cable hole CH2 may be defined between the other side of the control circuit board 160 and the second sound generator 230 when viewed from the top.

The heat-dissipation film 130 may be smaller than the first substrate 111 as shown in FIG. 5A. Accordingly, the four edges of the surface of the first substrate 111 may be exposed without being covered by the heat-dissipation film 130.

The first adhesive member 115 may be disposed on the four edges of the surface of the first substrate 111 exposed without being covered by the heat-dissipation film 130. The first adhesive member 115 may be used to attach the surface of the first substrate 111 to the surface of the bottom cover 180 as shown in FIG. 5A. In an exemplary embodiment, the first adhesive member 115 may be a double-sided tape including a buffer layer such as foam.

The blocking members 190, 191, 192 and 193 serve to block the vibration of the display panel 110 generated by each of the first sound generator 210, the second sound generator 220 and the third sound generator 230 from propagating or the sound generated by the vibration of the display panel 110 from propagating. The blocking members 190, 191, 192 and 193 may be attached to the surface of the heat-dissipation film 130 and the surface of the bottom cover 180 to block the propagation of the vibration of the display panel 110 or the transmission of the sound. In an alternative exemplary embodiment, when the heat-dissipation film 130 is eliminated, the blocking members 190, 191, 192 and 193 may be attached to one surface of the first substrate 111 and the other surface of the bottom cover 180.

The first blocking member 190 may be disposed on the four side edges of the heat-dissipation film 130. The second blocking member 191 may be extended in the first direction (x-axis direction) and may be disposed adjacent to the lower edge of the heat-dissipation film 130. The third blocking member 192 and the fourth blocking member 193 may be extended in the second direction (y-axis direction). The third blocking member 192 may be disposed between the first sound generator 210 and the second sound generator 220. The fourth blocking member 193 may be disposed between the first sound generator 210 and the third sound generator 230.

The surface of the heat-dissipation film 130 may be divided into a first area A1, a second area A2, a third area A3 and a fourth area A4 by the blocking members 190, 191, 192 and 193.

The first area A1 in which the first sound generator 210 is disposed may be defined by the first blocking member 190, the third blocking member 192 and the fourth blocking member 193 surrounding the first sound generator 210. Accordingly, it is possible to prevent or reduce the vibration of the display panel 110 or the sound generated by the first sound generator 210 of the first area A1 from being transmitted to the second area A2, the third area A3 and the fourth area A4.

The second region A2, in which the source circuit boards 140 are disposed, may be defined by the first blocking member 190 and the second blocking member 191 disposed to surround the source circuit boards 140. By virtue of the second area A2, it is possible to prevent or reduce the source circuit boards 140, the source driving circuits 121 and the flexible films 122 from being affected by the vibration of the display panel 110 or the sound generated by first sound generator 210 of the first area A1, the second sound generator 220 of the third area A3 and the third sound generator 230 of the fourth area A4.

The third area A3 in which the second sound generator 220 is disposed may be defined by the first blocking member 190, the second blocking member 191 and the third blocking member 192 surrounding the second sound generator 220. Accordingly, it is possible to prevent or reduce the vibration of the display panel 110 or the sound generated by the second sound generator 220 of the third area A3 from being transmitted to the first area A1 and the second area A2.

The fourth area A4 in which the third sound generator 230 is disposed may be defined by the first blocking member 190, the second blocking member 191 and the fourth blocking member 193 surrounding the third sound generator 230. Accordingly, it is possible to prevent or reduce the vibration of the display panel 110 or the sound generated by the third sound generator 230 of the fourth area A4 from being transmitted to the first area A1 and the second area A2.

Each of the blocking members 190, 191, 192 and 193 may include a base film 1911, a buffer layer 1921, a sacrificial layer 1931, a first adhesive layer 1941 and a second adhesive layer 1951.

The base film 1911 may include plastic. In an exemplary embodiment, the base film 1911 may be, but is not limited to, polyethylene terephthalate ("PET"), for example.

The buffer layer 1921 may be disposed on one surface of the base film 1911. The buffer layer 1921 may include a foam having elasticity. In an exemplary embodiment, the buffer layer 1921 may include, but is not limited to, polyurethane, silicone, rubber, or aerogel, for example.

The sacrificial layer 1931 may be disposed on one surface of the buffer layer 1921. The sacrificial layer 1931 serves as a separating layer when the blocking members are erroneously attached so that it has to be detached. In such case, a part of the first adhesive layer 1941 and the sacrificial layer 1931 may remain on the surface of the bottom cover 180. The sacrificial layer 1931 may include a low elastic material. In an exemplary embodiment, the sacrificial layer 1931 may include, but is not limited to, polyurethane, for example. In another exemplary embodiment, the sacrificial layer 1931 may be eliminated.

The first adhesive layer 1941 may be disposed on one surface of the sacrificial layer 1931. The first adhesive layer 1941 may be attached to the other surface of the bottom cover 180. The second adhesive layer 1951 may be disposed on the other surface of the base film 1911. The second adhesive layer 1951 may be attached on one surface of the heat-dissipation film 130. The first adhesive layer 1941 and the second adhesive layer 1951 may be, but is not limited to, acrylic adhesive or silicone adhesive.

According to the exemplary embodiment shown in FIGS. 3 to 6, the display device 10 may vibrate the display panel 110 by the first sound generator 210 to output a sound in a low-frequency range, may vibrate the display panel 110 by the second sound generator 220 to output a sound in a high-frequency range from the right side, and may vibrate the display panel 110 by the third sound generator 230 to output a sound in a high-frequency range from the left side. In such case, the display device 10 may output 2.1 channel stereo sounds and thus may provide a user with high quality sound.

According to the exemplary embodiment shown in FIGS. 3 to 6, the first sound circuit board 251 connected to the second sound generator 220 is connected to the control circuit board 160 through the first cable hole CH1 penetrating the bottom cover 180. Therefore, even though the second sound generator 220 is disposed on the surface of the heat-dissipation film 130 and the control circuit board 160 is disposed on the surface of the bottom cover 180, the control circuit board 160 may be easily electrically connected to the second sound generator 220.

In addition, according to the exemplary embodiment shown in FIGS. 3 to 6, the first sound generator 210, the second sound generator 220 and the third sound generator 230 are surrounded by the blocking members 190, 191, 192 and 193, it is possible to prevent or reduce the vibration of the display panel 110 or the sound generated by first sound generator 210, the second sound generator 220 and the third sound generator 230 from affecting one another.

Figure 7:
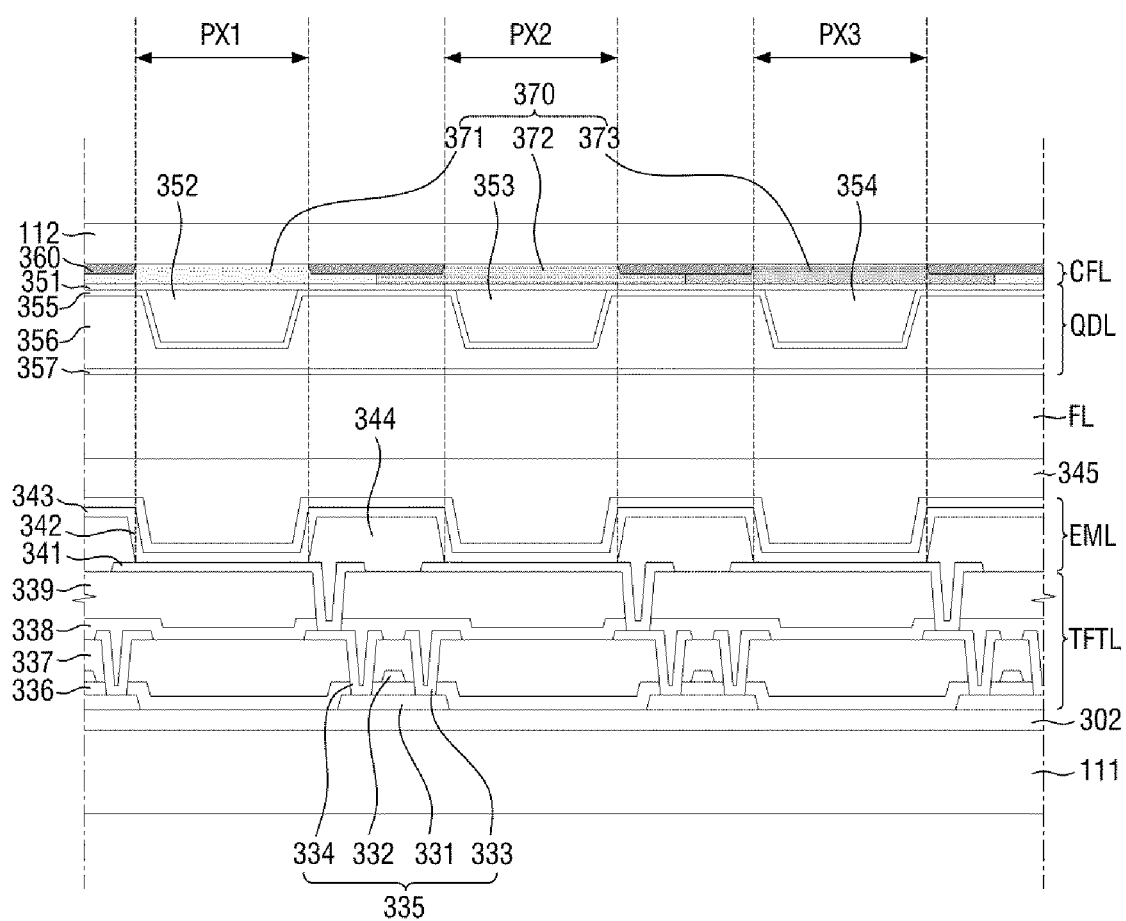
FIG. 7 is a cross-sectional view showing an exemplary embodiment of a display area of a display panel.

FIG. 7 is a cross-sectional view showing an exemplary embodiment of a display area of a display panel.

Referring to FIG. 7, the display panel 110 may include the first substrate 111, the second substrate 112, the TFT layer TFTL, the emission material layer EML, a filler layer FL, a wavelength conversion layer QDL, and a color filter layer CFL.

A buffer layer 302 may be disposed on one surface of the first substrate 111 that faces the second substrate 112. The buffer layer 302 may be disposed on the first substrate 111 to protect the TFTs 335 and the light-emitting elements from moisture permeating through the first substrate 111 that is susceptible to moisture permeation. The buffer layer 302 may include a plurality of inorganic layers stacked on one another alternately. In an exemplary embodiment, the buffer layer 302 may include multiple layers in which one or more inorganic layer of a silicon oxide layer (SiOx), a silicon nitride layer (SiNx) and SiON are stacked on one another alternately. In another exemplary embodiment, the buffer layer may be eliminated.

The TFT layer TFTL is disposed on the buffer layer 302. The TFT layer TFTL includes TFTs 335, a gate insulating layer 336, an interlayer dielectric layer 337, a protective layer 338, and a planarization layer 339.

The TFTs 335 are disposed on the buffer layer 302. Each of the TFTs 335 includes an active layer 331, a gate electrode 332, a source electrode 333 and a drain electrode 334. In FIG. 7, the TFTs 335 are implemented as top-gate transistors in which the gate electrode 332 is located above the active layer 331. It is, however, to be understood that the invention is not limited thereto. That is to say, the TFTs 335 may be implemented as bottom-gate transistors in which the gate electrode 332 is located below the active layer 331, or as double-gate transistors in which the gate electrodes 332 are disposed above and below the active layer 331.

The active layer 331 is disposed on the buffer layer 302. The active layer 331 may include a silicon-based semiconductor material or an oxide-based semiconductor material. A light-blocking layer for blocking external light incident on the active layer 331 may be disposed between the buffer layer and the active layer 331.

The gate insulating layer 336 may be disposed on the active layer 331. In an exemplary embodiment, the gate insulating layer 336 may include an inorganic layer, for example, a silicon oxide layer (SiOx), a silicon nitride layer (SiNx), or a multilayer thereof.

The gate electrode 332 and a gate line may be disposed on the gate insulating layer 336. In an exemplary embodiment, the gate electrode 332 and the gate line may include a single layer or multiple layers of one of molybdenum (Mo), aluminum (Al), chromium (Cr), gold (Au), titanium (Ti), nickel (Ni), neodymium (Nd) and copper (Cu) or an alloy thereof.

The interlayer dielectric layer 337 may be disposed over the gate electrode 332 and the gate line. In an exemplary embodiment, the interlayer dielectric layer 337 may include an inorganic layer, for example, a silicon oxide layer (SiOx), a silicon nitride layer (SiNx), or a multilayer thereof.

The source electrode 333, the drain electrode 334 and a data line may be disposed on the interlayer dielectric layer 337. Each of the source electrode 333 and the drain electrode 334 may be connected to the active layer 331 through a contact hole penetrating the gate insulating layer 336 and the interlayer dielectric layer 337. In an exemplary embodiment, the source electrode 333, the drain electrode and the data line may include a single layer or multiple layers of one of molybdenum (Mo), aluminum (Al), chromium (Cr), gold (Au), titanium (Ti), nickel (Ni), neodymium (Nd) and copper (Cu) or an alloy thereof.

The protective layer 338 may be disposed on the source electrode 333, the drain electrode 334, and the data line in order to insulate the TFTs 335. In an exemplary embodiment, the protective layer 338 may include an inorganic layer, e.g., a silicon oxide layer (SiOx), a silicon nitride layer (SiNx), or a multilayer thereof.

The planarization layer 339 may be disposed on the protective layer 338 to provide a flat surface over the step differences of the TFTs 335. The planarization layer 339 may include an organic layer such as an acryl resin, an epoxy resin, a phenolic resin, a polyamide resin and a polyimide resin.

The emission material layer EML is disposed on the TFT layer TFTL. The emission material layer EML includes a pixel-defining layer 344.

The light-emitting elements and the pixel-defining layer 344 are disposed on the planarization layer 339. The light-emitting element may be an organic light-emitting device. In such case, the light-emitting element may include an anode electrode 341, an emissive layer 342 and a cathode electrode 343.

The anode electrode 341 may be disposed on the planarization layer 339. The anode electrode 341 may be connected to the drain electrode 333 of the respective TFT 335 through a contact hole penetrating the protective layer 338 and the planarization layer 339.

The pixel-defining layer 344 may cover the edge of the anode electrode 341 on the planarization layer 339 in order to separate the pixels from one another. That is to say, the pixel-defining layer 344 serves to define sub-pixels PX1, PX2 and PX3. In each of the sub-pixels PX1, PX2 and PX3, the anode electrode 341, the emissive layer 342 and the cathode electrode 343 are sequentially stacked on one another so that holes from the anode electrode 341 and electrons from the cathode electrode 343 combine in the emissive layer 342 to emit light.

The emissive layers 342 are disposed on the anode electrode 341 and the pixel-defining layer 344. The emissive layer 342 may be an organic emissive layer. The emissive layer 342 may emit light having a short wavelength such as blue light and ultraviolet ("UV") light. In an exemplary embodiment, the peak wavelength range of blue light may be approximately 450 nanometers (nm) to approximately 490 nm, and the peak wavelength range of UV light may be less than approximately 450 nm, for example. In such case, the emissive layer 342 may be a common layer provided across the sub-pixels PX1, PX2 and PX3. In such case, the display panel 110 may include a light wavelength conversion layer QDL for converting light of a short wavelength such as blue light and UV light emitted from the emissive layer 342 into red light, green light and blue light, and a color filter layer CFL that transmits red light, green light and blue light.

The emissive layer 342 may include a hole transporting layer, a light-emitting layer, and an electron transporting layer. In addition, the emissive layer 342 may be provided in a tandem structure of two or more stacks, in which a charge generating layer may be disposed between the stacks.

The cathode electrode 343 is disposed on the emissive layer 342. The cathode electrode 343 may be disposed to cover the emissive layer 342. The cathode electrode 343 may be a common layer provided across the pixels.

The emission material layer EML may be provided so that light exits toward the second substrate 112, i.e., toward the top (the top-emission structure). In such case, the anode electrode 341 may include a metal material having a high reflectivity such as a stack structure of aluminum and titanium (Ti/Al/Ti), a stack structure of aluminum and indium tin oxide ("ITO") (ITO/Al/ITO), an Ag—Pd—Cu ("APC") alloy and a stack structure of APC alloy and ITO (ITO/APC/ITO). The APC alloy is an alloy of silver (Ag), palladium (Pd), and copper (Cu). The cathode electrode 263 may include a transparent conductive material ("TCP") such as ITO and indium zinc oxide ("IZO") that may transmit light, or a semi-transmissive conductive material such as magnesium (Mg), silver (Ag) and an alloy of magnesium (Mg) and silver (Ag). When the cathode electrode 343 includes a semi-transmissive conductive material, the light extraction efficiency may be increased by microcavities.

An encapsulation layer 345 is disposed on the emission material layer EML. The encapsulation layer 345 serves to prevent permeation of oxygen or moisture into the emissive layer 342 and the cathode electrode 343. To this end, the encapsulation layer 345 may include at least one inorganic layer. In an exemplary embodiment, the inorganic layer may include silicon nitride, aluminum nitride, zirconium nitride, titanium nitride, hafnium nitride, tantalum nitride, silicon oxide, aluminum oxide, or titanium oxide. Further, the encapsulation layer 345 may further include at least one organic layer. The organic layer may have a sufficient thickness to prevent particles from permeating into the encapsulation layer 345 and entering the emissive layer 342 and the cathode electrode 343. The organic layer may include one of epoxy, acrylate, and urethane acrylate.

The color filter layer CFL is disposed on one surface of the second substrate 112 facing the first substrate 111. The color filter layer CFL may include a black matrix 360 and color filters 370.

The black matrix 360 may be disposed on one surface of the second substrate 112. The black matrix 360 may be disposed such that it overlaps with the pixel-defining layer 344 but not with the sub-pixels PX1, PX2 and PX3. The black matrix 360 may include a black dye that may block light without transmitting it, or may include an opaque metal material.

The color filters 370 may overlap with the sub-pixels PX1, PX2 and PX3. The first color filters 371 may overlap the first sub-pixels PX1, respectively. The second color filters 372 may overlap with the second sub-pixels PX2, respectively. The third color filters 373 may overlap with the third sub-pixels PX3, respectively. In such case, the first color filter 371 may be light transmission filter of a first color that transmits light of the first color. The second color filter 372 may be light transmission filter of a second color that transmits light of the second color. The third color filter 373 may be light transmission filter of a third color that transmits light of the third color. In an exemplary embodiment, the first color may be red, the second color may be green, and the third color may be blue, for example. It is, however, to be understood that the invention is not limited thereto. In such case, the peak wavelength range of the red light passing through the first color filters 371 may be approximately 620 nm to approximately 750 nm. In an exemplary embodiment, the peak wavelength range of the green light passing through the second color filters 372 may be approximately 500 nm to approximately 570 nm, for example. In an exemplary embodiment, the peak wavelength range of the blue light passing through the third color filter 373 may be approximately 450 nm to approximately 490 nm, for example.

In addition, the edges of the two color filters adjacent to each other may overlap with the black matrix 360. As a result, color combination, which occurs when the light emitted from the emissive layer 342 of one of the sub-pixels proceeds to the color filter of an adjacent sub-pixel, may be prevented by the black matrix 360.

An overcoat layer may be disposed on the color filters 370 to provide a flat surface over the level differences of the color filters 370 and the black matrix 360. In another exemplary embodiment, the overcoat layer may be eliminated.

The wavelength conversion layer QDL is disposed on the color filter layer CFL. The wavelength conversion layer QDL may include a first capping layer 351, a first wavelength conversion layer 352, a second wavelength conversion layer 353, a third wavelength conversion layer 354, a second capping layer 355, an interlayer organic layer 356 and a third capping layer 357.

The first capping layer 351 may be disposed on the color filter layer CFL. The first capping layer 351 serves to prevent moisture or oxygen from permeating into the first wavelength conversion layer 352, the second wavelength conversion layer 353 and the third wavelength conversion layer 354 through the color filter layer CFL. In an exemplary embodiment, the first capping layer 351 may include an inorganic layer, for example, silicon nitride, aluminum nitride, zirconium nitride, titanium nitride, hafnium nitride, tantalum nitride, silicon oxide, aluminum oxide, or titanium oxide.

The first wavelength conversion layer 352, the second wavelength conversion layer 353 and the third wavelength conversion layer 354 may be disposed on the first capping layer 351.

The first wavelength conversion layer 352 may be disposed such that it overlaps with the first sub-pixel PX1. The first wavelength conversion layer 352 may convert a short-wavelength light such as blue light and UV light emitted from the emissive layer 342 of the first sub-pixel PX1 into light of the first color. To this end, the first wavelength conversion layer 352 may include a first base resin, first wavelength shifters, and first scatterers.

It is desired that the first base resin is a material having a high light transmittance and the first wavelength shifters and the first scatterers may be dispersed well in the first base resin. In an exemplary embodiment, the first base resin may include an organic material such as an epoxy resin, an acrylic resin, a cardo resin and or an imide resin.

The first wavelength shifters may convert or shift the wavelength range of incident light. The first wavelength shifters may be quantum dots, quantum rods, or phosphors. When the first wavelength shifters are quantum dots, they may have a specific band gap depending on their compositions and size as semiconductor nanocrystals. Therefore, the first wavelength shifters may absorb the incident light and then output light having a specific wavelength. Further, the first wavelength shifters may have a core-shell structure including core including nanocrystals and shells surrounding the cores. Examples of the nanocrystals of the core may include Group IV nanocrystals, Groups II-VI compound nanocrystals, Groups III-V compound nanocrystals, Groups IV-VI nanocrystals, or combinations thereof. The shell may serve as a protective layer for maintaining the semiconductor properties by preventing chemical denaturation of the core and/or as a charging layer for imparting electrophoretic properties to the quantum dots. In addition, the shell may include a single layer or multiple layers. The examples of the shell may include an oxide of a metal or a non-metal, a semiconductor compound, a combination thereof, etc.

The first scatterers may have a refractive index different from that of the first base resin and may form an optical interface with the first base resin. In an exemplary embodiment, the first scatterers may be light scattering particles, for example. In an exemplary embodiment, the first scatterers may be metal oxide particles such as titanium oxide ($TiO_2$), silicon oxide ($SiO_2$), zirconium oxide ($ZrO_2$), aluminum oxide ($Al_2O_3$), indium oxide ($In_2O_3$), zinc oxide (ZnO) and tin oxide ($SnO_2$). In an alternative exemplary embodiment, the first scatterers may be organic particles such as acrylic resin and urethane resin.

The first scatterers may scatter the incident light in random directions without substantially changing the wavelength of the light passing through the first wavelength conversion layer 352. By doing so, the length of the path in which the light passes through the first wavelength conversion pattern 352 may be increased, and the color conversion efficiency by the wavelength shifters may be increased.

In addition, the first wavelength conversion layer 352 may overlap with the first color filter 371. Therefore, a part of light of a short wavelength such as blue light and UV light provided from the first sub-pixel PX1 may not be converted into the light of the first color by the first wavelength shifters but may pass through the first wavelength conversion layer 352 as it is. However, the light of a short wavelength such as blue light and UV light which is not converted by the first wavelength conversion layer 352 and is incident on the first color filter 371 cannot pass through the first color filter 371. In contrast, the light of the first color converted by the first wavelength conversion layer 352 may pass through the first color filter 371 to exit toward the second substrate 112.

The second wavelength conversion layer 353 may be disposed such that it overlaps with the second sub-pixel PX2. The second wavelength conversion layer 353 may convert a short-wavelength light such as blue light and UV light emitted from the emissive layer 342 of the second sub-pixel PX2 into light of the second color. To this end, the second wavelength conversion layer 353 may include a second base resin, second wavelength shifters, and second scatterers. The second base resin, the second wavelength shifters and the second scatterers of the second wavelength conversion layer 353 are substantially identical to those of the first wavelength conversion layer 352, and therefore, the redundant description will be omitted. It should be noted that when the first wavelength shifters and the second wavelength shifters are quantum dots, the diameter of the second wavelength shifters may be smaller than the first shifter diameters.

In addition, the second wavelength conversion layer 353 may overlap with the second color filter 372. Therefore, a part of light of a short wavelength such as blue light and UV light provided from the second sub-pixel PX2 may not be converted into the light of the second color by the second wavelength shifters but may pass through the second wavelength conversion layer 353 as it is. However, the light of a short wavelength such as blue light and UV light which is not converted by the second wavelength conversion layer 353 and is incident on the second color filter 372 cannot pass through the second color filter 372. In contrast, the light of the second color converted by the second wavelength conversion layer 353 may pass through the second color filter 372 to exit toward the second substrate 112.

The third wavelength conversion layer 354 may be disposed such that it overlaps with the third sub-pixel PX3. The third wavelength conversion layer 354 may convert a short-wavelength light such as blue light and UV light emitted from the emissive layer 342 of the third sub-pixel PX3 into light of the third color. To this end, the third wavelength conversion layer 354 may include a third base resin and third scatterers. The third base resin and the third scatterers of the third wavelength conversion layer 354 are substantially identical to those of the first wavelength conversion layer 352, and therefore, the redundant description will be omitted.

In addition, the third wavelength conversion layer 354 may overlap with the third color filter 373. Therefore, light of a short wavelength such as blue light and UV light provided from the third sub-pixel PX3 may pass through the third wavelength conversion layer 354 as it is. The light passing through the third wavelength conversion layer 354 may pass through the third color filter 373 to exit toward the second substrate 112.

The second capping layer 355 may be disposed on the first wavelength conversion layer 352, the second wavelength conversion layer 353, the third wavelength conversion layer 354 and a part of the first capping layer 351 that is not covered by the wavelength conversion layers 352, 353 and 354. The second capping layer 355 serves to prevent moisture or oxygen from permeating into the first wavelength conversion layer 352, the second wavelength conversion layer 353 and the third wavelength conversion layer 354. In an exemplary embodiment, the second capping layer 355 may include an inorganic layer, for example, silicon nitride, aluminum nitride, zirconium nitride, titanium nitride, hafnium nitride, tantalum nitride, silicon oxide, aluminum oxide, or titanium oxide.

The interlayer organic layer 356 may be disposed on the second capping layer 355. The interlayer organic layer 356 may be a planarization layer for providing a flat surface over the level differences of the wavelength conversion layers 352, 353 and 354. In an exemplary embodiment, the interlayer organic layer 356 may include an organic layer such as an acryl resin, an epoxy resin, a phenolic resin, a polyamide resin and a polyimide resin.

The third capping layer 357 may be disposed on the interlayer organic layer 356. The third capping layer 357 may include an inorganic layer, for example, silicon nitride, aluminum nitride, zirconium nitride, titanium nitride, hafnium nitride, tantalum nitride, silicon oxide, aluminum oxide, or titanium oxide.

The filler layer FL may be disposed between the thin-film encapsulation layer of the first substrate 111 and the third capping layer 357 of the second substrate 112. The filler layer FL may include a material having a buffering function. In an exemplary embodiment, the filler layer FL may include an organic layer such as an acryl resin, an epoxy resin, a phenolic resin, a polyamide resin and a polyimide resin.

A sealing material for attaching the first substrate 111 to the second substrate 112 may be disposed in the non-display area of the display panel 110. When viewed from the top, the filler layer FL may be surrounded by the sealing material. The sealing material may be a glass frit or a sealant.

According to the exemplary embodiment shown in FIG. 7, the first to third sub-pixels PX1, PX2 and PX3 emit light of a short wavelength such as blue light and UV light. The light of the first sub-pixel PX1 is converted into light of the first color through the first wavelength conversion layer 352 and is then output through the first color filter CF1. The light of the second sub-pixel PX2 is converted into light of the second color through the second conversion layer 353 and is then output through the second color filter CF2. The light of the third sub-pixel PX3 is output through the third conversion layer 354 and the third color filter CF3.

According to the exemplary embodiment shown in FIG. 7, the sub-pixels PX1, PX2 and PX3 are provided as top-emission fashion that emit light toward the second substrate 112, i.e., the upward direction, and thus the heat-dissipation film 130 including an opaque material such as graphite and aluminum may be disposed on one surface of the first substrate 111.

FIG. 8 is a cross-sectional view showing an exemplary embodiment of the first sound generator of FIGS. 5A and 5B. FIGS. 9A and 9B are views showing an exemplary embodiment of vibration of the display panel by the first sound generator shown in FIG. 7.

Referring to FIGS. 8, 9A and 9B, the first sound generator 210 may be an exciter for vibrating the display panel 110 by generating a magnetic force using a voice coil. When the exciter is employed, a hole may be defined in a position where the first sound generator 210 is disposed on the control circuit board 160.

The first sound generator 210 may include a magnet 211, a bobbin 212, a voice coil 213, a damper 214, and a lower plate 215.

In an exemplary embodiment, the magnet 211 is a permanent magnet and may be a sintered magnet such as barium ferrite. In an exemplary embodiment, the magnet 211 may include, but is not limited to, ferric trioxide ($Fe_2O_3$), barium carbonate ($BaCO_3$), neodymium magnet, strontium ferrite with improved magnetic components, cast magnet of aluminum (Al), nickel (Ni), or cobalt (Co) alloy, etc. In an exemplary embodiment, the neodymium magnet may be, for example, neodymium-iron-boron (Nd—Fe—B).

The magnet 211 may include a plate 211a, a central projection 211b protruding from the center of the plate 211a, and side walls 211c protruding from the ends of the plate 211a, respectively. The central projection 211b may be spaced apart from the side walls 211c by a predetermined distance so that space may be defined between the central projection 211b and the side walls 211c. That is to say, the magnet 211 may have a cylindrical shape, and specifically, a circular space may be defined on a bottom surface of the cylindrical shape.

The central projection 211b of the magnet 211 may have the N magnetic pole while the plate 211a and the side walls 211c may have the S magnetic pole. Accordingly, an external magnetic field may be generated between the central projection 211b and the plate 211a and between the central projection 211b and the side walls 211c.

The bobbin 212 may be provided in a cylindrical shape. The central projection 211b of the magnet 211 may be disposed inside the bobbin 212. That is to say, the bobbin 212 may surround the central projection 211b of the magnet 211. In addition, the side walls 211c of the magnet 211 may be disposed outside the bobbin 212. In other words, the side walls 211c of the magnet 211 may be disposed around the bobbin 212. A space may be defined between the bobbin 212 and the central projection 211b of the magnet 211 and between the bobbin 212 and the side walls 211c of the magnet 211.

In an exemplary embodiment, the bobbin 212 may include a material obtained by processing pulp or paper, aluminum, magnesium or an alloy thereof, a synthetic resin such as polypropylene, or a polyamide-based fiber. One end of the bobbin 212 may be attached to the heat-dissipation film 130 using an adhesive member. The adhesive member may be a double-sided tape.

The voice coil 213 is wound around the outer circumferential surface of the bobbin 212. One end of the voice coil 213 adjacent to one end of the bobbin 212 may receive a 1A driving voltage, while the other end of the voice coil 213 adjacent to the other end of the bobbin 212 may receive a 1B driving voltage. Accordingly, an electrical current may flow through the voice coil 213 according to the 1A driving voltage and the 1B driving voltage. An induced magnetic field may be generated around the voice coil 213 according to the current flowing through the voice coil 213. The current flows in opposite directions when the 1A driving voltage is a positive voltage and the 1B driving voltage is a negative voltage and when the 1A driving voltage is a negative voltage and the 1B driving voltage is a positive voltage. Therefore, the N pole and the S pole of the induced magnetic field generated around the voice coil 213 may be switched as the 1A driving voltage and the 1B drive voltage are applied alternately. As a result, the attracting force and the repulsive force alternately work between the magnet 211 and the voice coil 213. Therefore, the bobbin 212 on which the voice coil 213 is wound may reciprocate in the third direction (z-axis direction) as shown in FIGS. 9A and 9B. Accordingly, the display panel 110 and the heat-dissipation film 130 vibrate in the third direction (z-axis direction), so that sound may be output.

The damper 214 is disposed between the upper portion of the bobbin 212 and the side walls 211c of the magnet 211. The damper 214 contracts and relaxes in accordance with the up-and-down movement of the bobbin 212 to regulate the up-and-down vibration of the bobbin 212. Since the damper 214 is connected to the bobbin 212 and the side walls 211c of the magnet 211, the up-and-down movement of the bobbin 212 may be restricted by the restoring force of the damper 214. In an exemplary embodiment, when the bobbin 212 vibrates above a certain height or below a certain height, the bobbin 212 may be restored to its original position by the restoring force of the damper 214.

The lower plate 215 may be disposed on the lower surface of the magnet 211. The lower plate 215 may be unitary with the magnet 211 or may be provided separately from the magnet 211. When the lower plate 215 is provided separately from the magnet 211, the magnet 211 may be attached to the lower plate 215 by an adhesive member such as a double-sided tape.

The lower plate 215 may be fixed to the control circuit board 160 by a fixing member 216 such as a screw. Accordingly, the magnet 211 may be fixed to the control circuit board 160.

Although the magnet 211 and the lower plate 215 are fixed to the control circuit board 160 in this exemplary embodiment, the exemplary embodiments of the invention are not limited thereto. The magnet 211 and the lower plate 215 may be fixed to a system circuit board, a power circuit board, a sound circuit board, or a dummy circuit board, instead of the control circuit board 160. The dummy circuit board refers to a circuit board in which no other element is disposed and only the magnet 211 and the lower plate 215 of the first sound generator 210 are fixed to it. The dummy circuit board may be a PCB or an FPCB. In an alternative exemplary embodiment, the magnet 211 and the lower plate 215 may be fixed to the bottom cover 180 rather than the control circuit board 160.

Figure 10:
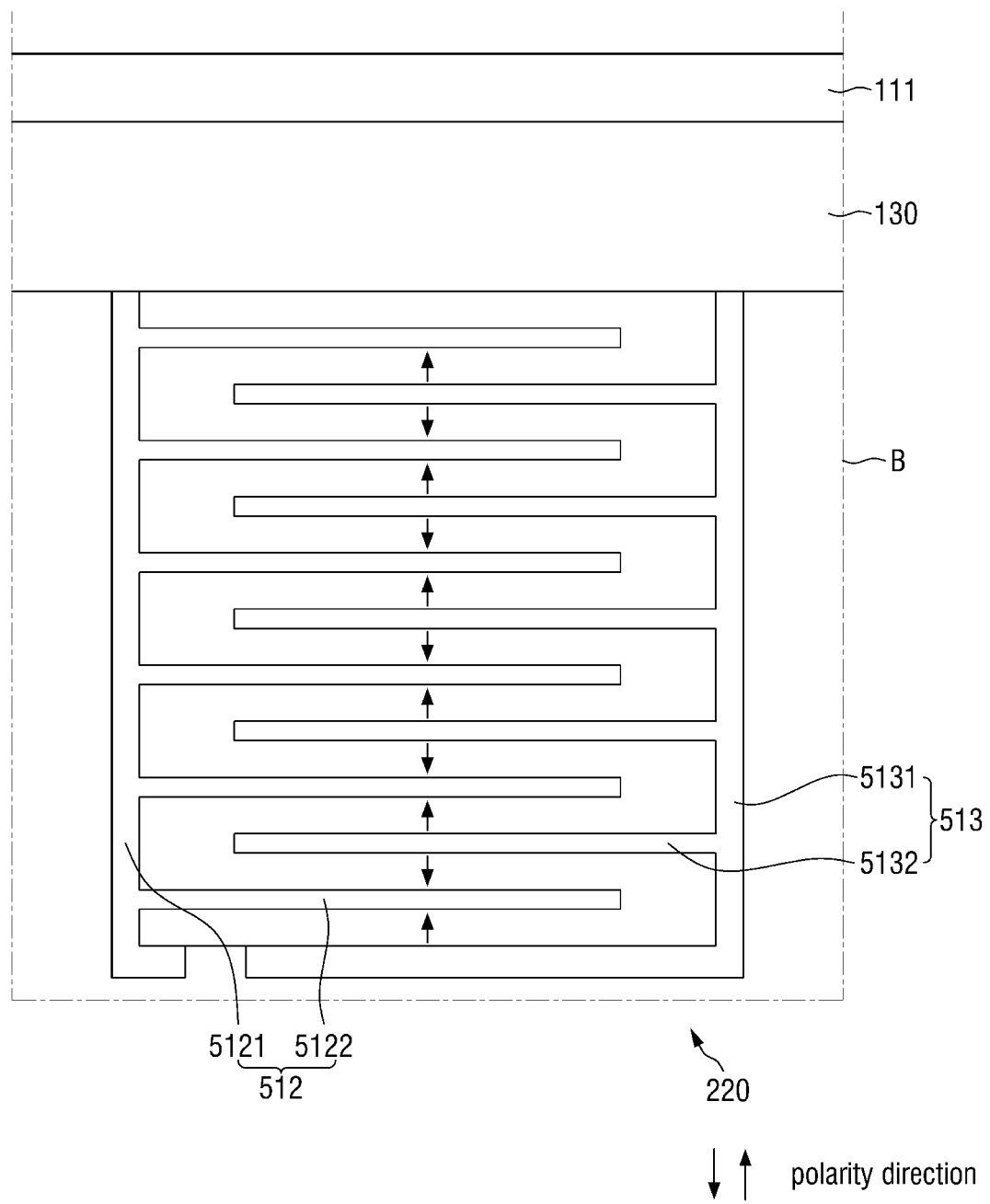
FIG. 10 is a cross-sectional view showing an exemplary embodiment of the second sound generator of FIGS. 5A and 5B.
Figure 11A:
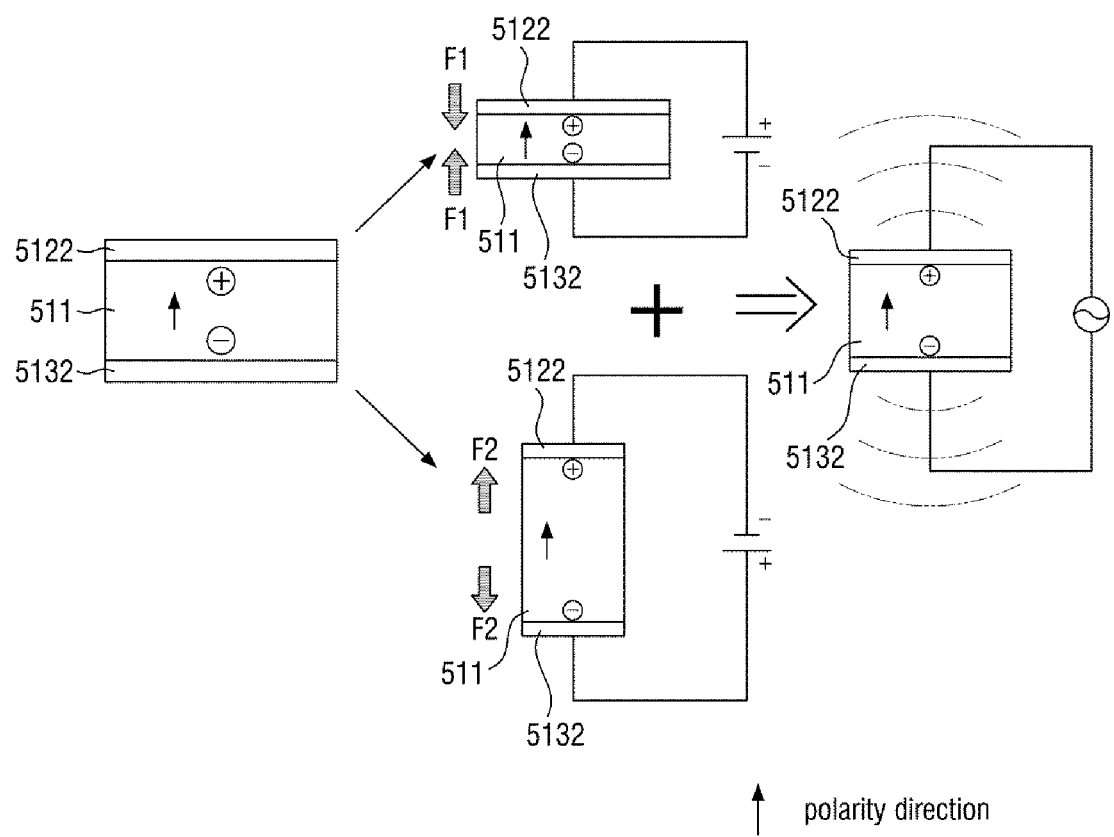
FIG. 11A is a view showing an exemplary embodiment of a way of vibrating a vibration layer disposed between the first branch electrodes and the second branch electrodes of the second sound generator.
Figure 11B:
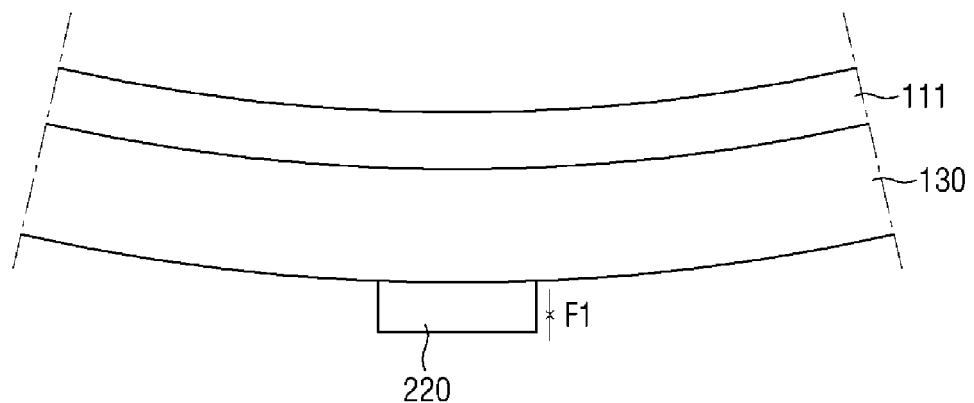

FIG. 10 is a cross-sectional view showing an exemplary embodiment of the second sound generator of FIGS. 5A and 5B. FIG. 11A is a view showing an exemplary embodiment of a way of vibrating a vibration layer disposed between the first branch electrodes and the second branch electrodes of the second sound generator. FIGS. 11B and 11C are side views showing an exemplary embodiment of vibration of the display panel by the second sound generator shown in FIG. 9.

Referring to FIGS. 10 and 11A to 11C, the second sound generator 220 may be a piezoelectric element or a piezoelectric actuator which vibrates the display panel 110 using a piezoelectric material that contracts or expands according to the applied voltage. The second sound generator 220 may include a vibration layer 511, a first electrode 512, and a second electrode 513.

A first electrode 512 may include a first stem electrode 5121 and first branch electrodes 5122. The first stem electrode 5121 may be disposed on only one side surface of the vibration layer 511 or may be disposed on the plurality of side surfaces of the vibration layer 511 as shown in FIG. 10. The first stem electrode 5121 may be disposed on the upper surface of the vibration layer 511. The first branch electrodes 5122 may branch off from the first stem electrode 5121. The first branch electrodes 5122 may be arranged in parallel.

A second electrode 513 may include a second stem electrode 5131 and second branch electrodes 5132. The second stem electrode 5131 may be disposed on only one side surface of the vibration layer 511 or may be disposed on the plurality of side surfaces of the vibration layer 511 as shown in FIG. 10. As shown in FIG. 10, the first stem electrode 5121 may be disposed on one of the plurality of side surfaces on which the second stem electrode 5131 is disposed. The second stem electrode 5131 may be disposed on the upper surface of the vibration layer 511. The first stem electrode 5121 may not overlap with the second stem electrode 5131. The second branch electrodes 5132 may branch off from the second stem electrode 5131. The second branch electrodes 5132 may be arranged in parallel.

The first branch electrodes 5122 and the second branch electrodes 5132 may be arranged in parallel to one another in the horizontal direction (x-axis direction or y-axis direction). In addition, the first branch electrodes 5122 and the second branch electrodes 5132 may be alternately arranged in the vertical direction (z-axis direction). Specifically, in the vertical direction (z-axis direction), the first branch electrode 5122 may be disposed, then the second branch electrode 5132 may be disposed, then the first branch electrode 5122 may be disposed, and so on.

The first electrode 512 and the second electrode 513 may be connected to metal lines or pad electrodes of the first sound circuit board 251 or the second sound circuit board 252. The metal lines or pad electrodes of the first sound circuit board 251 or the second sound circuit board 252 may be connected to the first electrode 512 and the second electrode 513 disposed on one surface of the second sound generator 220 or the third sound generator 230.

The vibration layer 511 may be a piezoelectric element that is deformed according to a first driving voltage applied to the first electrode 512 and a second driving voltage applied to the second electrode 513. In such case, the vibration layer 511 may be one of a piezoelectric material such as a poly vinylidene fluoride ("PVDF") film and a plumbum zirconate titanate ("PZT") and an electroactive polymer.

Because the vibration layer 511 is produced at a high temperature, the first electrode 512 and the second electrode 513 may include silver (Ag) having a high melting point or an alloy of silver (Ag) and palladium (Pd). In order to increase the melting point of the first electrode 512 and the second electrode 513, when the first electrode 512 and the second electrode 513 include an alloy of silver (Ag) and palladium (Pd), the content of silver (Ag) may be higher than the content of palladium (Pd).

The vibration layer 511 may be disposed in every space between the first branch electrodes 5122 and the second branch electrodes 5132. The vibration layer 511 contracts or expands according to a difference between the first driving voltage applied to the first branch electrodes 5122 and the second driving voltage applied to the second branch electrodes 5132.

Specifically, when the polarity direction of the vibration layer 511 disposed between the first branch electrode 5122 and the second branch electrode 5132 disposed under the first branch electrode 5122 is upward direction (↑), the vibration layer 511 has a positive polarity in its upper portion adjacent to the first branch electrode 5122 and a negative polarity in its lower portion adjacent to the second branch electrode 5132. In addition, when the polarity direction of the vibration layer 511 disposed between the second branch electrode 5132 and the first branch electrode 5122 disposed under the second branch electrode 5132 is downward direction (↓), the vibration layer 511 has a negative polarity in its upper portion adjacent to the second branch electrode 5132 and a positive polarity in its lower portion adjacent to the first branch electrode 5122. The polarity direction of the vibration layer 511 may be determined by a poling process of applying an electric field to the vibration layer 511 using the first branch electrodes 5122 and the second branch electrodes 5132.

As shown in FIG. 11A, when the polarity direction of the vibration layer 511 disposed between the first branch electrode 5122 and the second branch electrode 5132 disposed under the first branch electrode 5122 is the upward direction (↑), when the 2A driving voltage having the positive polarity is applied to the first branch electrode 5122 and the 2B driving voltage having the negative polarity is applied to the second branch electrode 5132, the vibration layer 511 may contract according to a first force F1. The first force F1 may be a contractive force. When the 2A driving voltage having the negative polarity is applied to the first branch electrode 5122 and the 2B driving voltage having the positive polarity is applied to the second branch electrode 5132, the vibration layer 511 may expand according to a second force F2. The second force F2 may be an expanding force.

Similarly, when the polarity direction of the vibration layer 511 disposed between the second branch electrode 5132 and the first branch electrode 5122 disposed under the second branch electrode 5132 is the downward direction (↓), when the 2A driving voltage having the positive polarity is applied to the second branch electrode 5132 and the 2B driving voltage having the negative polarity is applied to the first branch electrode 5122, the vibration layer 511 may expand according to the expanding force. When the 2A driving voltage having the negative polarity is applied to the second branch electrode 5132 and the 2B driving voltage having the positive polarity is applied to the first branch electrode 5122, the vibration layer 511 may contract according to a contractive force. The second force F2 may be a contractive force.

According to exemplary embodiment shown in FIGS. 10 and 11A to 11C, when polarities of the 2A driving voltage applied to the first electrode 512 and the 2B driving voltage applied to the second electrode 513 are alternately repeated between positive and negative polarities, the vibration layer 511 repeatedly contracts and expands. As a result, the second sound generator 220 vibrates.

Since the second sound generator 220 is disposed on one surface of the heat-dissipation film 130, when the vibration layer 511 of the second sound generator 220 contracts and expands, the display panel 110 vibrates vertically by the stress as shown in FIGS. 11B and 11C. As such, since the display panel 110 may vibrate by the sound generator 220, the display device 10 may output sound.

The third sound generator 230 is substantially identical to the second sound generator 220 described above with reference to FIGS. 10 and 11A to 11C, and therefore, the redundant description will be omitted.

Figure 12:
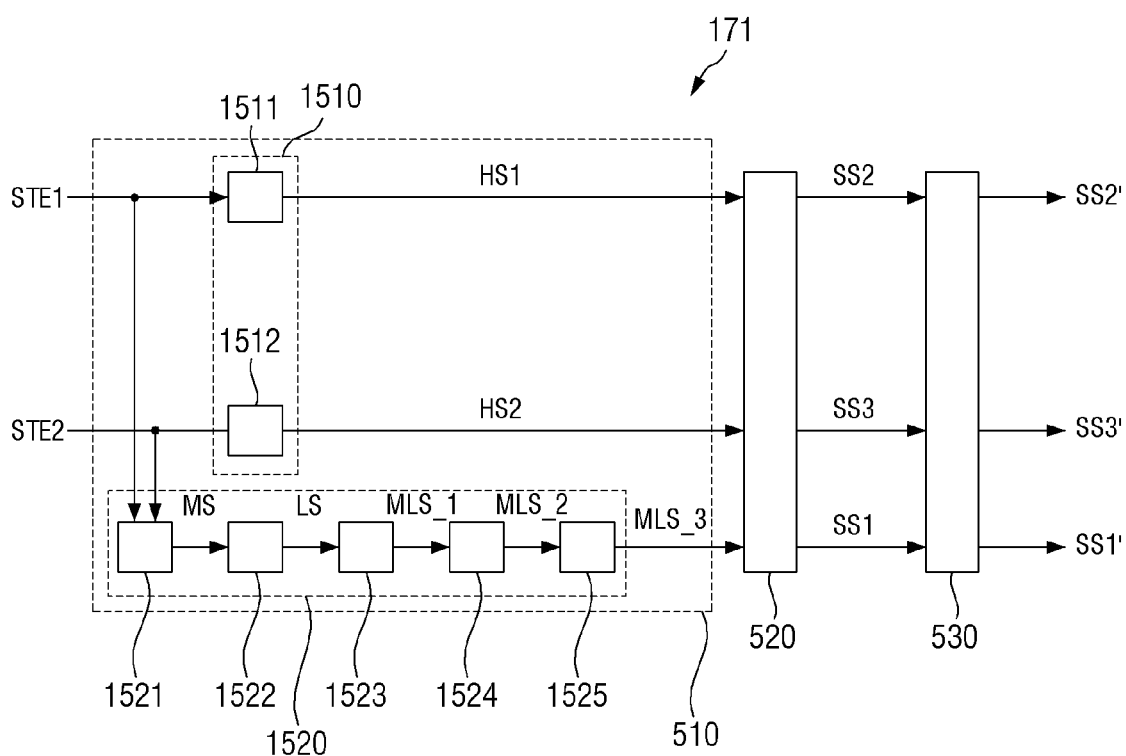
FIG. 12 is a block diagram showing an exemplary embodiment of the sound driver circuit of FIG. 6.
Figure 14A:
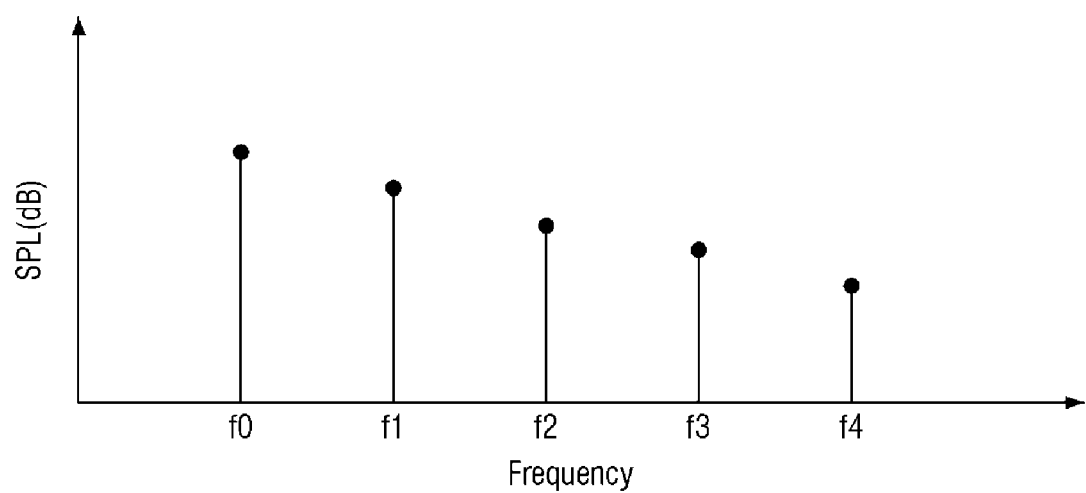
FIG. 14A is a graph showing sound pressure levels versus frequency of a modulated low-frequency signal before it passes through a third high-pass filter.
Figure 14B:
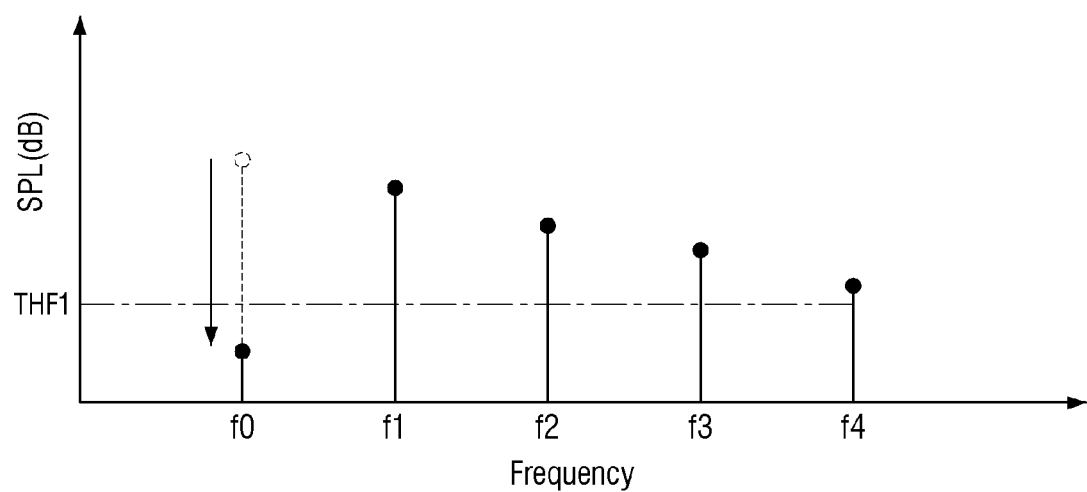
FIG. 14B is a graph showing sound pressure levels versus frequency of the modulated low-frequency signal after it has passed through the third high-pass filter.

FIG. 12 is a block diagram showing an exemplary embodiment of the sound driver circuit of FIG. 6. FIG. 13 is a flowchart for illustrating an exemplary embodiment of a way of modulating a sound by the sound driver circuit of FIG. 6. FIG. 14A is a graph showing sound pressure levels versus frequency of a modulated low-frequency signal before it passes through a third high-pass filter. FIG. 14B is a graph showing sound pressure levels versus frequency of the modulated low-frequency signal after it has passed through the third high-pass filter.

Referring to FIGS. 12, 13, 14A and 14B, the sound driver circuit 171 may include a DSP 510, a DAC 520, and an amplifying unit 530.

The DSP 510 processes a first stereo signal STE1 and a second stereo signal STE2 of input sound signals. The sound signals may be a digital signal or an analog signal. When the sound signals are analog signals, the DSP 510 may convert the sound signals into digital signals and then digitally process them. The first stereo signal STE1 may be a sound signal for the right stereo sound output while the second stereo signal STE2 may be a sound signal for the left stereo sound output.

The DSP 510 reproduces a first high-frequency signal HS1 from the first stereo signal STE1 and a second high-frequency signal HS2 from the second stereo signal STE2. In addition, it generates a mono signal MS by the first stereo signal STE1 and the second stereo signal STE2 and modulates the low-frequency signal LS reproduced from the mono signal MS to generate a modulated low-frequency signal MLS_1.

The DSP 510 includes a high-frequency output unit 1510 and a low-frequency output unit 1520. The high-frequency output unit 1510 may reproduce the first high-frequency signal HS1 from the first stereo signal STE1 to output it and may reproduce the second high-frequency signal HS2 from the second stereo signal STE2 to output it. The low-frequency output unit 1520 may generate a mono signal MS by the first stereo signal STE1 and the second stereo signal STE2 and may modulate the low-frequency signal LS reproduced from the mono signal MS to generate a modulated low-frequency signal MLS_1.

The high-frequency output unit 1510 may include a first high-pass filter 1511 and a second high-pass filter 1512.

Each of the first high-pass filter 1511 and the second high-pass filter 1512 is a filter capable of filtering a sound signal in a first high-frequency range. Each of the first high-pass filter 1511 and the second high-pass filter 1512 is a filter capable of filtering a sound signal above a first threshold frequency, thereby eliminating a low-frequency sound signal lower than the first threshold frequency. In other words, each of the first high-pass filter 1511 and the second high-pass filter 1512 may lower the sound pressure level of a low-frequency sound signal lower than the first threshold frequency.

The first high-pass filter 1511 may filter a sound signal in the first high-frequency range from the input first stereo signal STE1 to output the first high-frequency signal HS1. The second high-pass filter 1512 may filter a sound signal in the second high-frequency range from the input second stereo signal STE2 to output the second high-frequency signal HS2. The first high-frequency signal HS1 may be a sound signal for outputting the right high-frequency stereo sound while the second high-frequency signal HS2 may be a sound signal for outputting the left high-frequency stereo sound (operation S101 in FIG. 13).

The low-frequency output unit 1520 may include a mono signal generator 1521, a first low-pass filter 1522, a low-frequency signal modulator 1523, a third high-pass filter 1524, and a gain multiplier 1525.

The mono signal generator 1521 receives the first stereo signal STE1 and the second stereo signal STE2. The mono signal generator 1521 generates and outputs a mono signal MS for outputting a mono sound according to the first stereo signal STE1 for outputting the right stereo sound and the second stereo signal STE2 for outputting the left stereo sound.

The first low-pass filter 1522 is a filter capable of filtering sound signals of the first low-frequency range. The first low-pass filter 1522 is a filter capable of filtering a sound signal lower than the first threshold frequency, thereby eliminating high-frequency sound signals above the first threshold frequency. That is to say, the first low-pass filter 1522 may lower the sound pressure level of a high-frequency sound signal above the first threshold frequency. The first low-pass filter 1522 may filter a sound signal in the first low-frequency range from the input mono signal MS and output the low-frequency signal LS (operation S102 of FIG. 13).

Each of the first high-pass filter 1511, the second high-pass filter 1512 and the first low-pass filter 1522 receives and filters the first stereo signal STE1, the second stereo signal STE2 or the mono signal MS based on the same first threshold frequency. As a result, the signal may be divided into a first high-frequency signal HS1 and a second high-frequency signal HS2 including a sound signal in a high-frequency range and a low-frequency signal LS including a sound signal in a low-frequency range with respect to the first threshold frequency. That is to say, it is possible to process a sound signal in a dual frequency range in which a sound signal in a high-frequency range is digitally processed and a sound signal in a low-frequency range is digitally processed.

The low-frequency signal modulator 1523 modulates the low-frequency signal LS so that a harmonic tone is produced based on a fundamental tone from the low-frequency signal LS. The low-frequency signal modulator 1523 may generate high-frequency harmonic tones from the fundamental tone of the low-frequency signal LS. The low-frequency signal modulator 1523 may use a feedback loop circuit to generate high-frequency harmonic tones from the fundamental tone. In an alternative exemplary embodiment, the low-frequency signal modulator 1523 may include a pitch detection algorithm and a posterior synchronous modulation to produce the high-frequency harmonic tones from the fundamental tone.

In an exemplary embodiment, the low-frequency signal modulator 1523 may generate a modulated low-frequency signal MLS_1 including the fundamental tone and the 4th order harmonic tones as shown in FIG. 14A, for example. In FIG. 14A, the frequency of the fundamental tone may be f0, the frequency of the first harmonic tone may be f1, the frequency of the second harmonic tone may be f2, the frequency of the third harmonic tone is f3, and the frequency of the fourth harmonic tone may be f4. The frequency f1 of the first harmonic tone may be equal to twice the frequency f0 of the fundamental tone, the frequency f2 of the second harmonic tone may be equal to three times the frequency f0 of the fundamental tone, the frequency f3 of the third harmonic tone may be equal to four times the frequency f0 of the fundamental tone, and the frequency f4 of the fourth harmonic tone may be equal to five times the frequency f0 of the fundamental tone. The pitch between the frequency f1 of the first harmonic tone and the frequency f0 of the fundamental tone, the pitch between the frequency f2 of the second harmonic tone and the frequency f1 of the first harmonic tone, the pitch between the frequency f3 of the third harmonic tone and the frequency f2 of the second harmonic tone, and the pitch between the frequency f4 of the fourth harmonic tone and the frequency f3 of the third harmonic tone all may be substantially the same. In addition, the sound pressure level of the fundamental tone is the highest, and the sound pressure level may be lowered from the fundamental tone to the fourth harmonic tone (operation S103 of FIG. 13).

The third high-pass filter 1524 is a filter capable of filtering a sound signal in the first high-frequency range. The third high-pass filter 1524 is a filter capable of filtering a sound signal above the first threshold frequency, thereby eliminating a low-frequency sound signal below the first threshold frequency. That is to say, the third high-pass filter 1524 may lower the sound pressure level of a low-frequency sound signal below the first threshold frequency.

The third high-pass filter 1524 filters a sound signal in the first high-frequency range from the modulated low-frequency signal MLS_1. As shown in FIG. 14B, in a modulated low-frequency signal MLS_2 that has passed through the third high-pass filter 1524, the frequency f0 of the fundamental tone may be lower than the first threshold frequency THF1. As shown in FIG. 14B, in the modulated low-frequency signal MLS_2 that has passed through the third high-pass filter 1524, the frequency f1 of the first harmonic tone, the frequency f2 of the second harmonic tone, the frequency f3 of the third harmonic tone and the frequency f4 of the fourth harmonic tone may be above the first threshold frequency THF1. Accordingly, in the modulated low-frequency signal MLS_2 that has passed through the third high-pass filter 1524, the sound pressure level of the fundamental tone is lowered while the sound pressure level of the first harmonic tone, the sound pressure level of the second harmonic tone, the sound pressure level of the third harmonics tone and the sound pressure level of the fourth harmonic tone may be maintained as they are, as shown in FIG. 14B. Therefore, in the modulated low-frequency signal MLS_2 that has passed through the third high-pass filter 1524, the sound pressure level of the fundamental tone may be lower than the sound pressure level of the first harmonic tone, the sound pressure level of the second harmonic tone, the sound pressure level of the third harmonic tone and the sound pressure level of the fourth harmonic tone.

According to the psychology of sound, even when the sound pressure level of the fundamental tone is lowered by the third high-pass filter 1524, a user may feel as when she/he hears the fundamental tone when the first harmonic tone, the second harmonic tone, the third harmonic tone and the fourth harmonic having the frequencies of two times, three times, four times and five times the frequency f0 of the fundamental tone are supplemented. That is to say, even when the fundamental tone having the lowest frequency is omitted, the user may feel as when she/he hears the low-frequency sound according to the psychology of sound. Therefore, it is possible to provide a user with low-frequency sounds even without increasing the area of the sound generators in a small display device. Further, in middle- or large-sized display devices, it is possible to provide a user with low-frequency sounds without recognizing the vibration of the display panel.

The gain multiplier 1525 applies a gain value to the modulated low-frequency signal MLS_2 filtered by the third high-pass filter 1524. When the modulated low-frequency signal MLS_2 filtered by the third high-pass filter 1524 is converted into the first sound signal SS1 without being multiplied with a gain value and output to the first sound generator 210, there may occur posterior signal distortion and a system overload of the first sound generator 210. For this reason, the gain multiplier 1525 may restrict the filtered modulated low-frequency signal MLS_2 by applying a gain value to the modulated low-frequency signal MLS_2 filtered by the third high-pass filter 1524 (operation S104 of FIG. 13).

The DAC 520 receives the first high-frequency signal HS1 filtered by the first high-pass filter 1511, the second high-frequency signal HS2 filtered by the second high-pass filter 1512, and the modulated low-frequency signal MLS_3 output from the gain multiplier 1525. The DAC 520 converts the modulated low-frequency signal MLS_3, which is a digital signal, into a first sound signal SS1, which is an analog signal, converts the first high-frequency data HS1, which is a digital signal, into a second sound signal SS2, which is an analog signal, and converts the second high-frequency data HS2, which is a digital signal, into a third sound signal SS3, which is an analog signal. The DAC 520 outputs the first sound signal SS1, the second sound signal SS2 and the third sound signal SS3 to the amplifying unit 530.

The amplifying unit 530 may amplify the first sound signal SS1, the second sound signal SS2 and the third sound signal SS3 using a plurality of AMPs. Each of the plurality of AMPs may include an operational AMP ("OP-AMP"). The amplifying unit 530 may output the amplified first sound signal SS1' to the first sound generator 210, may output the amplified second sound signal SS2' to the second sound generator 220, and may output the amplified third sound signal SS3' to the third sound generator 230.

According to the exemplary embodiment shown in FIG. 12, even when the sound pressure level of the fundamental tone is lowered by the third high-pass filter 1524 in the modulated low-frequency signal MLS_1, a user may feel as when she/he hears the fundamental tone when the first harmonic tone, the second harmonic tone, the third harmonic tone and the fourth harmonic having the frequencies of two times, three times, four times and five times the frequency f0 of the fundamental tone are supplemented, according to the psychology of sound. That is to say, even when the fundamental tone having the lowest frequency is omitted, the user may feel as when she/he hears the low-frequency sound according to the psychology of sound. Therefore, it is possible to provide a user with low-frequency sounds even without increasing the area of the sound generators in a small display device. Further, in middle- or large-sized display devices, it is possible to provide a user with low-frequency sounds without recognizing the vibration of the display panel.

FIG. 15 is a view showing an exemplary embodiment of the bottom of a display device. FIG. 16 is a view showing an exemplary embodiment of the blocking members, the first sound generator, and the second sound generator when viewed from the bottom.

The display device 10 according to exemplary embodiment shown in FIGS. 15 and 16 is different from the display device according to exemplary embodiment in FIGS. 3 and 4 in that the former further includes a fourth sound generator 240 and the position of the first sound generator 210 is changed. Description will focus on differences between the exemplary embodiments and the redundant description will be omitted.

Referring to FIGS. 15 and 16, a fourth sound generator 240 may be further disposed on one surface of the first substrate 111 or on one surface of the heat-dissipation film 130, in addition to the first sound generator 210, the second sound generator 220, and the third sound generator 230. The fourth sound generator 240 may be a vibrating device capable of vibrating the display panel 110 in the third direction (z-axis direction). In such case, the display panel 110 may work as a diaphragm for outputting sound. The fourth sound generator 240 may be an exciter for vibrating the display panel 110 by generating a magnetic force using a voice coil as shown in FIGS. 8, 9A and 9B.

The fourth sound generator 240 may serve as a low-frequency sound generator for outputting a fourth sound in a low-frequency range. Therefore, the display device 10 may provide a user with a high-quality sound including both the low-frequency range and the high-frequency range by outputting sounds of a low-frequency range using the first sound generator 210 and the fourth sound generator 240 and outputting sounds of a high-frequency range using the second sound generator 220 and the third sound generator 230.

The first sound generator 210 may be disposed closer to one side of the display panel 110, for example, to the right side of the display panel 110, than the fourth sound generator 240 is. The fourth sound generator 240 may be disposed closer to the other side of the display panel 110, for example, to the left side of the display panel 110, than the first sound generator 210 is. In such case, the first sound generator 210 may be disposed adjacent to the second sound generator 220 than the fourth sound generator 240 is. The fourth sound generator 240 may be disposed adjacent to the third sound generator 230 than the first sound generator 210 is. Accordingly, the display device 10 may vibrate the display panel 110 using the first sound generator 210 to output a sound in a low-frequency range from the right side, and may vibrate the display panel 110 using the second sound generator 220 to output a sound in a high-frequency range from the right side. In addition, the display device 10 may vibrate the display panel 110 using the third sound generator 230 to output a sound in a high-frequency range from the left side, and may vibrate the display panel 110 using the fourth sound generator 240 to output a sound in a low-frequency range from the left side. In such case, the display device 10 may output 2.2 channel stereo sounds and thus may provide a user with high quality sound.

In the foregoing description, the first sound generator 210 and the fourth sound generator 240 are exciters while the second sound generator 220 and the third sound generator 230 are piezoelectric elements or piezoelectric actuators. It is, however, to be understood that the invention is not limited thereto. The first sound generator 210, the second sound generator 220, the third sound generator 230 and the fourth sound generator 240 may all be exciters, piezoelectric elements, or piezoelectric actuators.

In the example shown in FIGS. 5 and 6, the lower plate 215 of the first sound generator 210 is disposed on the control circuit board 160 to be fixed to the control circuit board 160, and the magnet 211 is disposed in the hole H1 defined in the control circuit board 160 and the hole H2 defined in the bottom cover 180. In contrast, in the example shown in FIGS. 15 and 16, the lower plate 215 of each of the first sound generator 210 and the fourth sound generator 240 may be disposed on the bottom cover 180 and fixed to the bottom cover 180. In the example, the magnet 211 may be disposed in the hole defined in the bottom cover 180.

The bobbin 212 of the fourth sound generator 240 may be fixed on one surface of the heat-dissipation film 130, and the magnet 211 may be fixed to the bottom cover 180. Therefore, the bobbin 212, on which the voice coil 213 is wound, may reciprocate in the third direction (z-axis direction) according to the applied magnetic field generated around the voice coil 213, such that the display panel 110 may vibrate.

The magnet 211, the bobbin 212, the voice coil 213 and the lower plate 215 of the fourth sound generator 240 are substantially identical to those described above with reference to FIGS. 8, 9A and 9B, and therefore, the redundant description will be omitted The fourth sound generator 240 may receive a fourth sound signal including a 4A driving voltage and a 4B driving voltage from the sound driver circuit 171. The fourth sound generator 240 may output sound by vibrating the display panel 110 according to the 4A driving voltage and the 4B driving voltage. The fourth sound generator 240 may be connected to a 2B connector 152b of the control circuit board 160 by a fourth sound circuit board 254.

In addition, since the first sound generator 210 is not disposed on the control circuit board 160, it may be connected to the 2B connector 152b of the control circuit board 160 by the third sound circuit board 253.

A first pad and a second pad connected to a first electrode and a second electrode, respectively, disposed on a surface of the first sound generator 210 or the fourth sound generator 240 may be disposed on one side of each of the third sound circuit board 253 and the fourth sound circuit board 254. A connection portion for connecting to the 2B connector 152b of the control circuit board 160 may be disposed on the other side of each of the third sound circuit board 253 and the fourth sound circuit board 254. That is to say, the first sound generator 210 may be electrically connected to the control circuit board 160 by the third sound circuit board 253, and the fourth sound generator 240 may be electrically connected to the control circuit board 160 by the fourth sound circuit board 254. Each of the third sound circuit board 253 and the fourth sound circuit board 254 may be an FPCB or a flexible cable.

The blocking members 190, 191, 194, 195 and 196 serve to block the vibration of the display panel 110 generated by each of the first sound generator 210, the second sound generator 220, the third sound generator 230 and the fourth sound generator 240 from propagating or the sound generated by the vibration of the display panel 110 from propagating. The blocking members 190, 191, 194, 195 and 196 may be attached to the surface of the heat-dissipation film 130 and the surface of the bottom cover 180 to block the propagation of the vibration of the display panel 110 or the transmission of the sound. In an alternative exemplary embodiment, when the heat-dissipation film 130 is eliminated, the blocking members 190, 191, 194, 195 and 196 may be attached to one surface of the first substrate 111 and the other surface of the bottom cover 180.

The first blocking member 190 and the second blocking member 191 are substantially identical to those described above with reference to FIG. 4, and therefore, the redundant description will be omitted. The fifth blocking member 194 may be extended in the second direction (y-axis direction), while the sixth blocking member 195 and the seventh blocking member 196 may be extended in the first direction (x-axis direction). The fifth blocking member 194 may be disposed between the first sound generator 210 and the fourth sound generator 240 and between the second sound generator 220 and the third sound generator 230. The sixth blocking member 195 may be disposed between the first sound generator 210 and the second sound generator 220. The seventh blocking member 196 may be disposed between the third sound generator 230 and the fourth sound generator 240.

The surface of the heat-dissipation film 130 may be divided into a first area A1, a second area A2, a third area A3, a fourth area A4 and fifth area A5 by the blocking members 190, 191, 194, 195 and 196 as shown in FIG. 16.

The first area A1 in which the first sound generator 210 is disposed may be defined by the first blocking member 190, the second blocking member 191, the fifth blocking member 194 and the six block member 195 surrounding the first sound generator 210. Accordingly, it is possible to prevent or reduce the vibration of the display panel 110 or the sound generated by the first sound generator 210 of the first area A1 from being transmitted to the second area A2, the third area A3, the fourth area A4 and the fifth area A5.

The second region A2, where the source circuit boards 140 are disposed, may be defined by the first blocking member 190 and the second blocking member 191 arranged to surround the source circuit boards 140. By virtue of the second area A2, it is possible to prevent or reduce the source circuit boards 140, the source driver circuits 121 and the flexible films 122 from being affected by the vibration of the display panel 110 or the sound generated by first sound generator 210 of the first area A1 and the fourth sound generator 240 of the fifth area A5.

The third area A3 in which the second sound generator 220 is disposed may be defined by the first blocking member 190, the fifth blocking member 194 and the sixth blocking member 195 surrounding the second sound generator 220. Accordingly, it is possible to prevent or reduce the vibration of the display panel 110 or the sound generated by the second sound generator 220 of the third area A3 from being transmitted to the first area A1, the fourth area A4 and the fifth area A5.

The fourth area A4 in which the third sound generator 230 is disposed may be defined by the first blocking member 190, the fifth blocking member 194 and the seventh blocking member 196 surrounding the third sound generator 230. Accordingly, it is possible to prevent or reduce the vibration of the display panel 110 or the sound generated by the third sound generator 230 of the fourth area A4 from being transmitted to the first area A1, the third area A3 and the fifth area A5.

The fifth area A5 in which the fourth sound generator 240 is disposed may be defined by the first blocking member 190, the second blocking member 191, the fifth blocking member 194 and the seventh block member 197 surrounding the fourth sound generator 240. Accordingly, it is possible to prevent or reduce the vibration of the display panel 110 or the sound generated by the fourth sound generator 240 of the fifth area A5 from being transmitted to the first area A1, the second area A2, the third area A3 and the fourth area A4.

Figure 17:
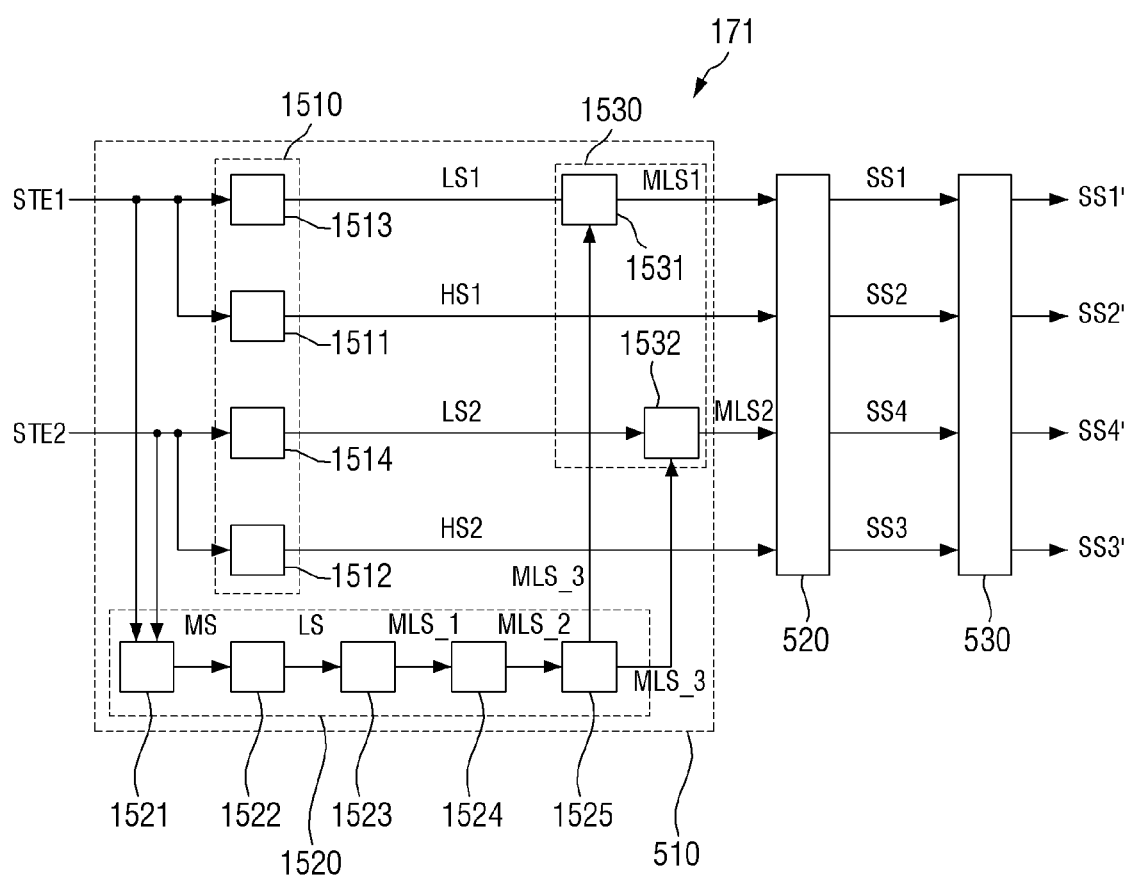
FIG. 17 is a block diagram showing an exemplary embodiment of the sound driver circuit of FIG. 6.
Figure 18:
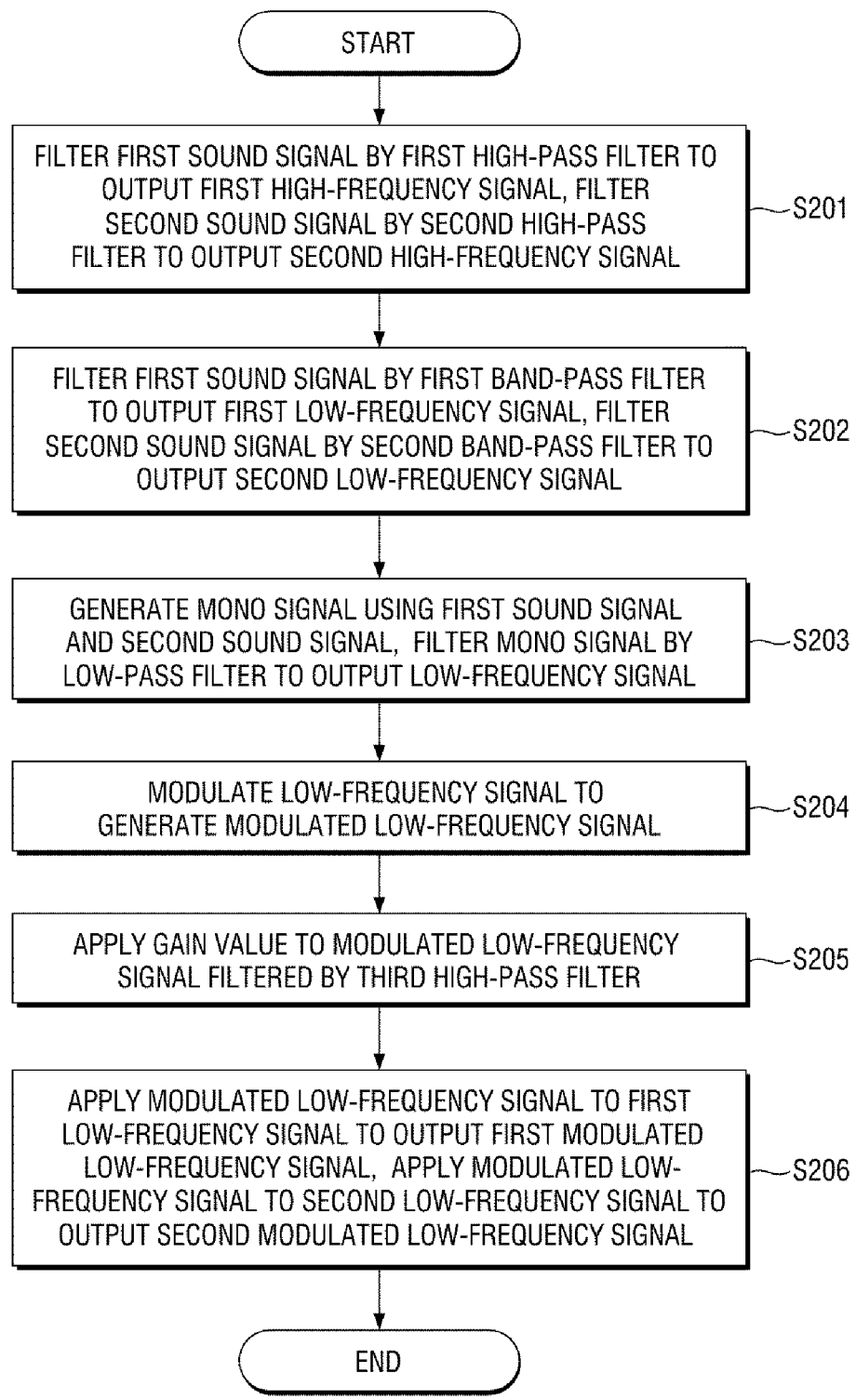
FIG. 18 is a flowchart for illustrating an exemplary embodiment of a way of modulating a sound by the sound driver circuit of FIG. 6.

FIG. 17 is a block diagram showing an exemplary embodiment of the sound driver circuit of FIG. 6. FIG. 18 is a flowchart for illustrating an exemplary embodiment of a way of modulating a sound by the sound driver circuit of FIG. 6.

The exemplary embodiment shown in FIGS. 17 and 18 is different from the exemplary embodiment shown in FIGS. 12 and 13 in that a sound driver circuit (e.g., DSP) 171 further includes a first band-pass filter 1513, a second band-pass filter 1514, and a low-frequency modulation output unit 1530. In the following description, description will focus on differences between the exemplary embodiments and the redundant description will be omitted.

Referring to FIGS. 17 and 18, a sound driver circuit 171 may include a DSP 510, a DAC 520, and an amplifying unit 530.

The DSP 510 includes a high/low-frequency output unit 1510, a low-frequency output unit 1520 and a low-frequency modulation output unit 1530. The high/low-frequency output unit 1510 may reproduce a first high-frequency signal HS1 and a first low-frequency signal LS1 from a first stereo signal STE1 to output them and may reproduce a second high-frequency signal HS2 and a second low-frequency signal LS2 from a second stereo signal STE2 to output them. The low-frequency output unit 1520 may generate a mono signal MS by the first stereo signal STE1 and the second stereo signal STE2 and may modulate the low-frequency signal LS reproduced from the mono signal MS to generate a modulated low-frequency signal MLS_3. The low-frequency modulation output unit 1530 may output a first modulated low-frequency signal MLS1 by applying the modulated low-frequency signal MLS_3 to the first low-frequency signal LS1 and may output a second modulated low-frequency signal MSL2 by applying the modulated low-frequency signal MLS_3 to the second low-frequency signal LS2.

The high/low-frequency output unit 1510 may include a first high-pass filter 1511, a second high-pass filter 1512, a first band-pass filter 1513 and a second band-pass filter 1514.

The first high-pass filter 1511 and the second high-pass filter 1512 are substantially identical to those described above with reference to FIGS. 12 and 13, and therefore, the redundant description will be omitted (operation S201 in FIG. 18).

Each of the first band-pass filter 1513 and the second band-pass filter 1514 is a filter capable of filtering sound signals of a first low-frequency range. Each of the band-pass filter 1513 and the second band-pass filter 1514 is a filter capable of filtering a sound signal between a second threshold frequency and a third threshold frequency, thereby eliminating a low-frequency sound signal lower than the second threshold frequency and a high-frequency sound signal higher than the third threshold frequency. That is to say, each of the first band-pass filter 1513 and the second band-pass filter 1514 may lower the sound pressure level of a low-frequency sound signal lower than the second threshold frequency, and the sound pressure level of a high-frequency sound signal higher than the third threshold frequency. The second threshold frequency may be lower than the first threshold frequency, and the third threshold frequency may be substantially equal to or lower than the first threshold frequency.

The first band-pass filter 1513 may filter a sound signal in the first low-frequency range from the input first stereo signal STE1 to output the first low-frequency signal LS1. The second band-pass filter 1514 may filter a sound signal in the second low-frequency range from the input second stereo signal STE2 to output the second low-frequency signal LS2. The first low-frequency signal LS1 may be a sound signal for outputting the right low-frequency stereo sound while the second low-frequency signal LS2 may be a sound signal for outputting the left low-frequency stereo sound (operation S202 in FIG. 18).

The low-frequency output unit 1520 is substantially identical to that of the exemplary embodiment shown in FIGS. 12 and 13 except that a first low-pass filter 1522 and a third high-pass filter 1523 filter input signals based on a second threshold frequency instead of a first threshold frequency, and that a modulated low-frequency signal MLS_3 is not output to the DAC 520 but to a first low-frequency modulation output unit 1531 and a second low-frequency modulation output unit 1532, and therefore, the redundant description will be omitted (operations S203, S204 and S205 in FIG. 18).

The low-frequency modulation output unit 1530 may include the first low-frequency modulation output unit 1531 and a second low-frequency modulation output unit 1532.

The first low-frequency modulation output unit 1531 receives a first low-frequency signal LS1 and a modulated low-frequency signal MLS_3. The first low-frequency modulation output unit 1531 may add the modulated low-frequency signal MLS_3 to the first low-frequency signal LS1 to generate the first modulated low-frequency signal MLS_1. The first low-frequency modulation output unit 1531 may output the first modulated low-frequency signal MLS1 to the DAC 520.

The second low-frequency modulation output unit 1532 receives a second low-frequency signal LS2 and a modulated low-frequency signal MLS_3. The second low-frequency modulation output unit 1532 may add the modulated low-frequency signal MLS_3 to the second low-frequency signal LS2 to generate the second modulated low-frequency signal MLS_2. The second low-frequency modulation output unit MLS2 may output the second modulated low-frequency signal MLS2 to the DAC 520 (operation S206 of FIG. 18).

The DAC 520 receives the first high-frequency signal HS1 filtered by the first high-pass filter 1511, the second high-frequency signal HS2 filtered by the second high-pass filter 1512, the first modulated low-frequency signal MLS1 output from the first low-frequency modulation output unit 1531, and the second modulated low-frequency signal MLS2 output from the second low-frequency modulation output unit 1532. The DAC 520 converts the first modulated low-frequency signal MLS1, which is a digital signal, into a first sound signal SS1, which is an analog signal, and converts the first high-frequency data HS1, which is a digital signal, into a second sound signal S S2, which is an analog signal. The DAC 520 converts the second high-frequency data HS2, which is a digital signal, into a third sound signal SS2, which is an analog signal, and converts the second modulated low-frequency signal MLS2, which is a digital signal, into a fourth sound signal SS4, which is an analog signal. The DAC 520 outputs the first sound signal SS1, the second sound signal SS2, the third sound signal SS3 and the fourth sound signal SS4 to the amplifying unit 530.

The amplifying unit 530 may amplify the first sound signal SS1, the second sound signal SS2, the third sound signal SS3 and the fourth sound signal SS4 using a plurality of AMPs. Each of the plurality of AMPs may include an OP-AMP. The amplifying unit 530 may output the amplified first sound signal SS1' to the first sound generator 210 and may output the amplified second sound signal SS2' to the second sound generator 220. The amplifying unit 530 may output the amplified third sound signal SS3' to the third sound generator 230 and may output the amplified fourth sound signal SS4' to the fourth sound generator 240.

According to the exemplary embodiment shown in FIGS. 17 and 18, even when the sound pressure level of the fundamental tone of each of the sound signal for outputting a low-frequency stereo sound from the right side and the sound signal for outputting a low-frequency stereo sound from the left side is lowered, the first harmonic tone, the second harmonic tone, the third harmonic tone and the fourth harmonic having the frequencies of two times, three times, four times and five times the frequency f0 of the fundamental tone are supplemented. As a result, a user may feel as when she/he hears the fundamental tone according to the psychology of sound. That is, even when the fundamental tone having the lowest frequency is omitted, the user may feel as when she/he hears the low-frequency sound according to the psychology of sound. Therefore, it is possible to provide a user with 2.2 channel stereo sounds including low-frequency sounds even without increasing the area of the sound generators in a small display device. Further, in middle- or large-sized display devices, it is possible to provide a user with low-frequency sounds without recognizing the vibration of the display panel.

Figure 20:
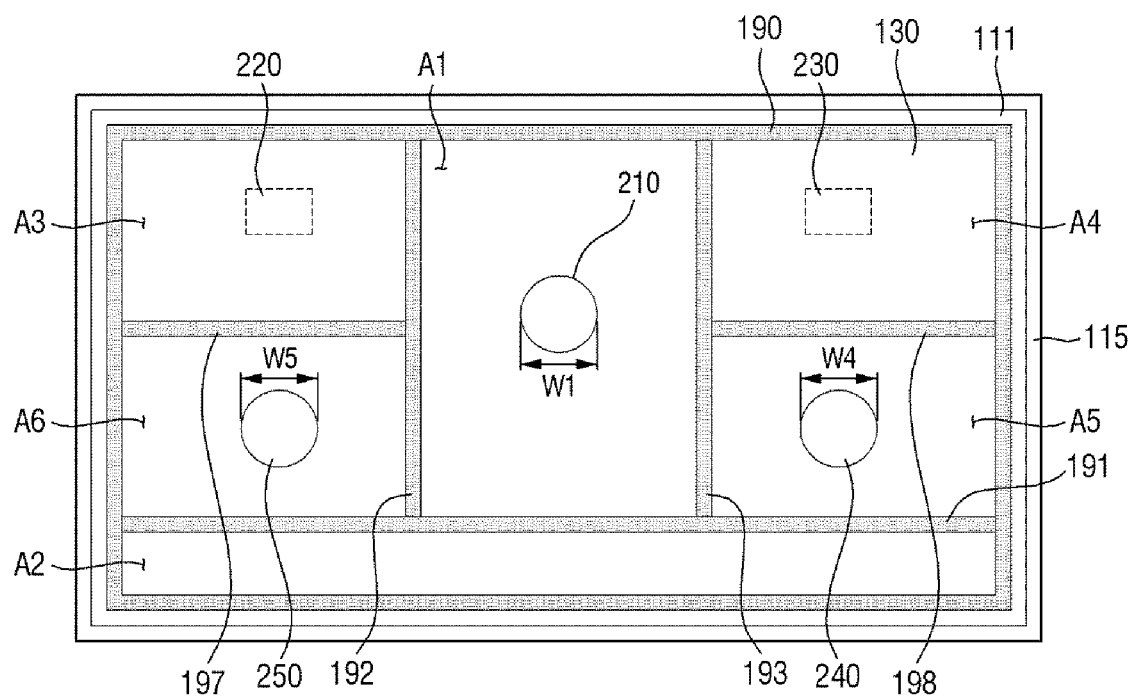
FIG. 20 is a view showing an exemplary embodiment of the blocking members, the first sound generator and the second sound generator when viewed from the bottom.

FIG. 19 is a view showing an exemplary embodiment of the bottom of a display device. FIG. 20 is a view showing an exemplary embodiment of the blocking members, the first sound generator and the second sound generator when viewed from the bottom The exemplary embodiment shown in FIGS. 19 and 20 is different from the exemplary embodiment in FIGS. 3 and 4 in that the display device 10 further includes a fourth sound generator 240 and the fifth sound generator 250. Description will focus on differences between the exemplary embodiments and the redundant description will be omitted.

Referring to FIGS. 19 and 20, a fourth sound generator 240 and a fifth sound generator 250 may be further disposed on one surface of the first substrate 111 or on one surface of the heat-dissipation film 130, in addition to the first sound generator 210, the second sound generator 220 and the third sound generator 230. The fourth sound generator 240 and the fifth sound generator 250 may be a vibrating device capable of vibrating the display panel 110 in the third direction (z-axis direction). In such case, the display panel 110 may work as a diaphragm for outputting sound. The fourth sound generator 240 and the fifth sound generator 250 may be exciters for vibrating the display panel 110 by generating a magnetic force using a voice coil as shown in FIGS. 8, 9A and 9B.

The fourth sound generator 240 may serve as a low-frequency sound generator for outputting a fourth sound in a low-frequency range. The fifth sound generator 250 may serve as a low-frequency sound generator for outputting a fifth sound in a low-frequency range. Therefore, the display device 10 may provide a user with a high-quality sound including both the low-frequency range and the high-frequency range by outputting sounds of a low-frequency range using the first sound generator 210, the fourth sound generator 240 and the fifth sound generator 250 and outputting sounds of a high-frequency range using the second sound generator 220 and the third sound generator 230.

The fifth sound generator 250 may be disposed closer to one side of the display panel 110, for example, to the right side of the display panel 110, than the fourth sound generator 240 is. The fourth sound generator 240 may be disposed closer to the other side of the display panel 110, for example, to the left side of the display panel 110, than the fifth sound generator 250 is. In such case, the fifth sound generator 250 may be disposed adjacent to the second sound generator 220 than the fourth sound generator 240 is. The fourth sound generator 240 may be disposed adjacent to the third sound generator 230 than the fifth sound generator 250 is. The first sound generator 210 may be disposed closer to the center of the display panel 110 than the fourth sound generator 240 and the fifth sound generator 250 are.

The display device 10 may output a sound in the low-frequency range from the center by vibrating the display panel 110 using the first sound generator 210. Accordingly, the display device 10 may vibrate the display panel 110 using the fifth sound generator 250 to output a sound in a low-frequency range from the right side, and may vibrate the display panel 110 using the second sound generator 220 to output a sound in a high-frequency range from the right side. In addition, the display device 10 may vibrate the display panel 110 using the third sound generator 230 to output a sound in a high-frequency range from the left side, and may vibrate the display panel 110 using the fourth sound generator 240 to output a sound in a low-frequency range from the left side. In such case, the display device 10 may output 2.3 channel stereo sounds and thus may provide a user with high quality sound.

The first sound generator 210 may be larger than the fourth sound generator 240 and the fifth sound generator 250. In an exemplary embodiment, the width W1 of the first sound generator 210 in the first direction (x-axis direction) may be larger than the width W4 of the fourth sound generator 240 in the first direction (x-axis direction) and the width W5 of the fifth sound generator 250 in the first direction (x-axis direction), for example. In an alternative exemplary embodiment, the width of the first sound generator 210 in the second direction (y-axis direction) may be larger than the width of the fourth sound generator 240 in the second direction (y-axis direction) and the width of the fifth sound generator 250 in the second direction (y-axis direction). Since the vibration displacement of the display panel 110 is proportional to the cross-sectional area of the sound generators, the low-frequency characteristics of the first sound output by the first sound generator 210 may be better than the low-frequency characteristics of the fourth sound output by the fourth sound generator 240 and the low-frequency characteristics of the fifth sound output by the fifth sound generator 250. That is to say, the first sound generator 210 may serve as a main woofer.

In the foregoing description, the first sound generator 210, the fourth sound generator 240 and the fifth sound generator 250 are exciters while the second sound generator 220 and the third sound generator 230 are piezoelectric elements or piezoelectric actuators. It is, however, to be understood that the invention is not limited thereto. The first sound generator 210, the second sound generator 220, the third sound generator 230, the fourth sound generator 240 and the fifth sound generator 250 may all be exciters, piezoelectric elements, or piezoelectric actuators.

The lower plate 215 of each of the fourth sound generator 240 and the fifth sound generator 250 may be disposed on the bottom cover 180 and fixed to the bottom cover 180. In the example, the magnet 211 may be disposed in the hole defined in the bottom cover 180. The bobbin 212 of each of the fourth sound generator 240 and the fifth sound generator 250 may be fixed on one surface of the heat-dissipation film 130, and the magnet 211 may be fixed to the bottom cover 180. Therefore, the bobbin 212, on which the voice coil 213 is wound, may reciprocate in the third direction (z-axis direction) according to the applied magnetic field generated around the voice coil 213, such that the display panel 110 may vibrate.

The magnet 211, the bobbin 212, the voice coil 213 and the lower plate 215 of each of the fourth sound generator 240 and the fifth sound generator 250 are substantially identical to those described above with reference to FIGS. 8, 9A and 9B, and therefore, the redundant description will be omitted The fourth sound generator 240 may receive a fourth sound signal including a 4A driving voltage and a 4B driving voltage from the sound driver circuit 171. The fourth sound generator 240 may output sound by vibrating the display panel 110 according to the 4A driving voltage and the 4B driving voltage. The fourth sound generator 240 may be connected to a 2B connector 152*b* of the control circuit board 160 by a fourth sound circuit board 254.

The fifth sound generator 250 may receive a fifth sound signal including a 5A driving voltage and a 5B driving voltage from the sound driver circuit 171. The fifth sound generator 250 may output sound by vibrating the display panel 110 according to the 5A driving voltage and the 5B driving voltage. The fifth sound generator 250 may be connected to a 2B connector 152*b* of the control circuit board 160 by a third sound circuit board 253.

A first pad and a second pad connected to a first electrode and a second electrode, respectively, disposed on a surface of the fourth sound generator 240 or the fifth sound generator 250 may be disposed on one side of each of the third sound circuit board 253 and the fourth sound circuit board 254. A connection portion for connecting to the 2B connector 152*b* of the control circuit board 160 may be disposed on the other side of each of the third sound circuit board 253 and the fourth sound circuit board 254. That is to say, the fifth sound generator 250 may be electrically connected to the control circuit board 160 by the third sound circuit board 253, and the fourth sound generator 240 may be electrically connected to the control circuit board 160 by the fourth sound circuit board 254. Each of the third sound circuit board 253 and the fourth sound circuit board 254 may be an FPCB or a flexible cable.

The blocking members 190, 191, 192, 193, 197 and 198 serve to block the vibration of the display panel 110 generated by each of the first sound generator 210, the second sound generator 220, the third sound generator 230, the fourth sound generator 240 and the fifth sound generator 250 from propagating or the sound generated by the vibration of the display panel 110 from propagating. The blocking members 190, 191, 192, 193, 197 and 198 may be attached to the surface of the heat-dissipation film 130 and the surface of the bottom cover 180 to block the propagation of the vibration of the display panel 110 or the transmission of the sound. In an alternative exemplary embodiment, when the heat-dissipation film 130 is eliminated, the blocking members 190, 191, 192, 193, 197 and 198 may be attached to one surface of the first substrate 111 and the other surface of the bottom cover 180.

Figure 21:
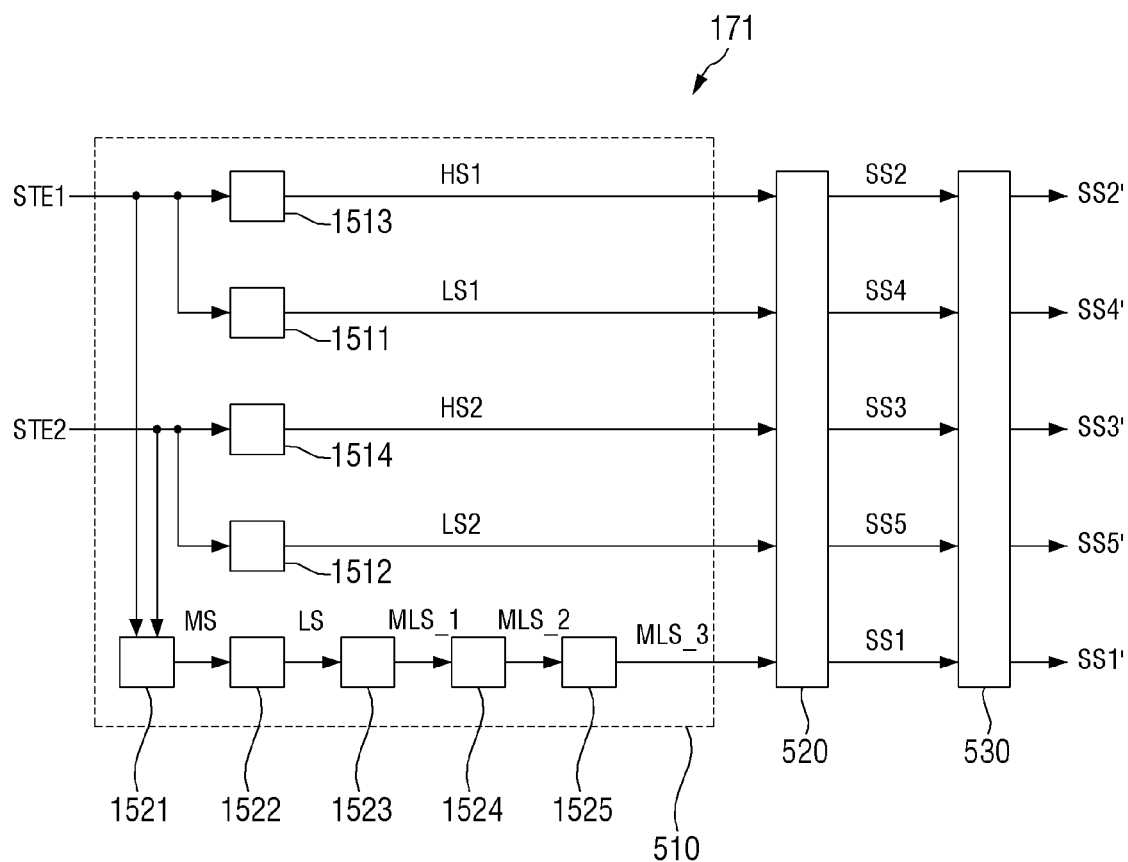
FIG. 21 is a block diagram showing an exemplary embodiment of the sound driver circuit of FIG. 6.
Figure 22:
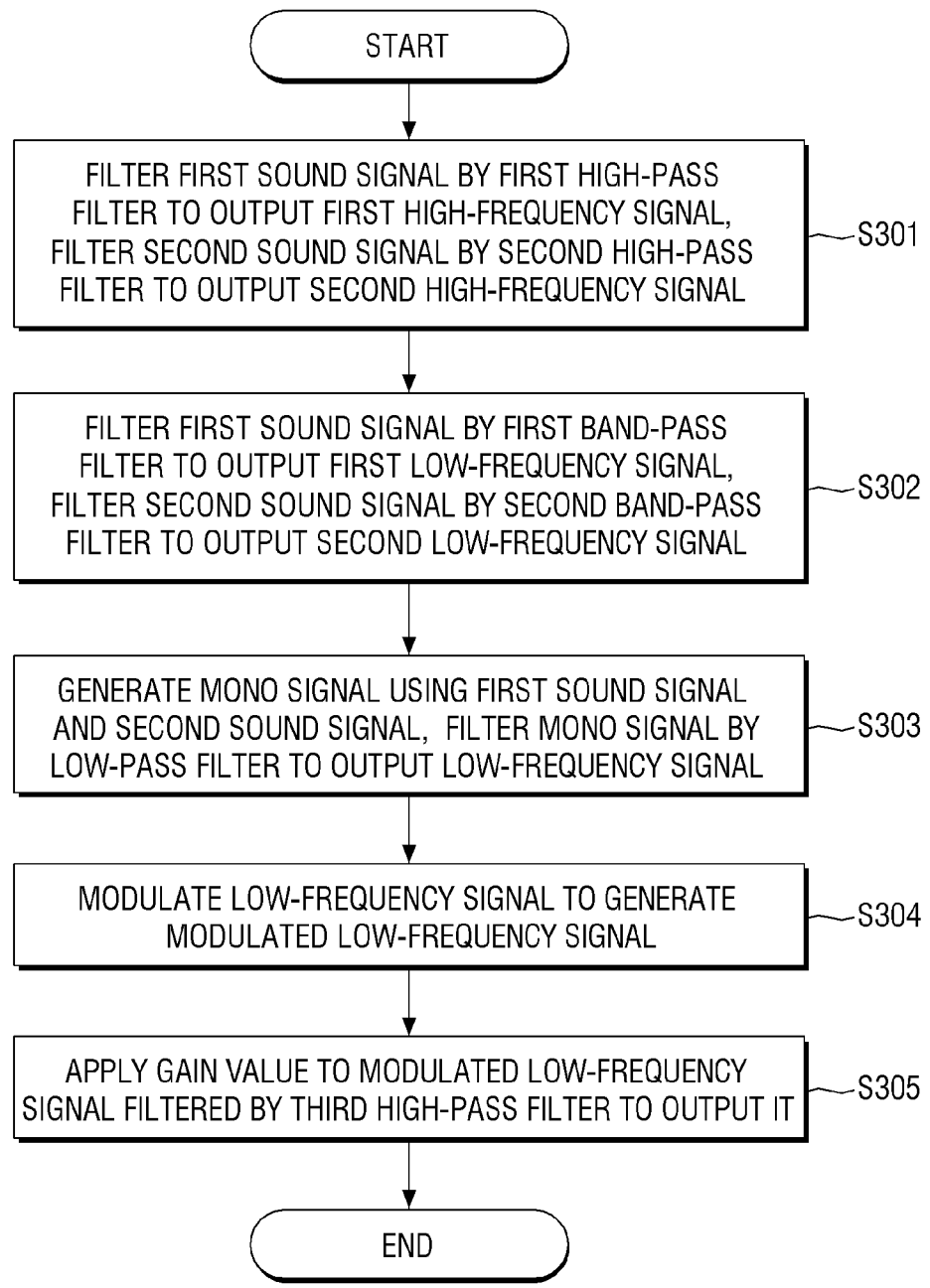
FIG. 22 is a flowchart for illustrating an exemplary embodiment of a way of modulating a sound by the sound driver circuit of FIG. 6.

The exemplary embodiment shown in FIG. 20 is different from the exemplary embodiment shown in FIG. 4 in that the third area A3 shown in FIG. 4 is divided by the eighth blocking member 197 into a third area A3 in which the second sound generator 220 is disposed and a sixth area A6 in which the fifth sound generator 250 is disposed. In addition, the exemplary embodiment shown in FIG. 20 is different from the exemplary embodiment shown in FIG. 4 in that the fourth area A4 shown in FIG. 4 is divided by the ninth blocking member 198 into a fourth area A4 in which the third sound generator 230 is disposed and a fifth area A5 in which the fourth sound generator 240 is disposed FIG. 21 is a block diagram showing an exemplary embodiment of the sound driver circuit of FIG. 6. FIG. 22 is a flowchart for illustrating an exemplary embodiment of a way of modulating a sound by the sound driver circuit of FIG. 6.

The exemplary embodiment shown in FIGS. 21 and 22 is different from the exemplary embodiment shown in FIGS. 12 and 13 in that a sound driver circuit (e.g., DSP) 171 further includes a first band-pass filter 1513 and a second band-pass filter 1514.

The first band-pass filter 1513 and the second band-pass filter 1514 (operation S302 in FIG. 22) are substantially identical to those of the exemplary embodiment shown in FIGS. 17 and 18. In addition, as described above with reference to FIGS. 17 and 18, a first low-pass filter 1522 and third high-pass filter 1523 of a low-frequency output unit 1520 may filter an input signal with respect to a second threshold frequency instead of a first threshold frequency. Accordingly, the exemplary embodiment (e.g., operations S301 and S303 to S305) shown in FIGS. 21 and 22 will not be described in detail.

While embodiments are described above, it is not intended that these embodiments describe all possible forms of the invention of the invention. Rather, the words used in the specification are words of description rather than limitation, and it is understood that various changes may be made without departing from the spirit and scope of the invention of the invention. Additionally, the features of various implementing embodiments may be combined to form further embodiments of the invention.

What is claimed is:

1. A display device comprising:
    a display panel comprising a first substrate;
    a first sound generator which is disposed on a surface of the first substrate and vibrates the display panel according to a first sound signal to output a first sound;
    a second sound generator which is disposed on the surface of the first substrate and vibrates the display panel according to a second sound signal to generate a second sound in a higher frequency range than the first sound; and
    a sound driver circuit which generates the first sound signal and the second sound signal from a first stereo signal and outputs the first sound signal to the first sound generator and the second sound signal to the second sound generator,
    wherein a sound pressure level of a fundamental tone of the first sound is lower than a sound pressure level of a first harmonic tone of the first sound.

2. The display device of claim 1, wherein the first sound comprises k harmonic tones, wherein k is a positive integer, and wherein the sound pressure level of the fundamental tone of the first sound is less than a sound pressure level of a $k^{th}$ harmonic tone of the first sound.

3. The display device of claim 1, further comprising:
    a third sound generator which is disposed on the surface of the first substrate and vibrates the display panel according to a third sound signal to generate a third sound in a higher frequency range than the first sound, wherein the sound driver circuit generates the third sound signal from a second stereo signal to output the third sound signal to the third sound generator.

4. The display device of claim 3, wherein the sound driver circuit comprises:

a digital signal processor which reproduces a first high-frequency signal from the first stereo signal, reproduces a second high-frequency signal from the second stereo signal, generates a mono signal from the first stereo signal and the second stereo signal, and generates a modulated low-frequency signal by modulating a low-frequency signal reproduced from the mono signal;
a digital-to-analog converter which converts the modulated low-frequency signal into the first sound signal, converts the first high-frequency signal into the second sound signal and converts the second high-frequency signal into the third sound signal; and
an amplifier which amplifies the first sound signal, the second sound signal and the third sound signal to output them.

5. The display device of claim 4, wherein the digital signal processor comprises:
    a first high-pass filter which filters a sound signal in a first high-frequency range from the first stereo signal to output the first high-frequency signal; and
    a second high-pass filter which filters a sound signal in the first high-frequency range from the second stereo signal to output the second high-frequency signal.

6. The display device of claim 5, wherein the digital signal processor further comprises:
    a mono signal generator which generates the mono signal from the first stereo signal and the second stereo signal;
    a low-pass filter which filters a sound signal in a low-frequency range to output the low-frequency signal;
    a low-frequency signal modulator which modulates the low-frequency signal so that a harmonic tone of the k harmonic tones is generated based on a fundamental tone of the low-frequency signal to generate the modulated low-frequency signal;
    a third high-pass filter which filters a sound signal in the first high-frequency range from the modulated low-frequency signal; and
    a gain multiplier which applies a gain value to the modulated low-frequency signal filtered by the third high-pass filter and outputs a gained modulated low-frequency signal.

7. The display device of claim 6, wherein the first high-frequency range is above a first threshold frequency, and the low-frequency range is below the first threshold frequency.

8. The display device of claim 3, wherein the first sound generator vibrates the display panel by generating a magnetic force using a voice coil, and
    wherein each of the second sound generator and the third sound generator vibrates the display panel by a piezoelectric material which contracts or expands depending on a voltage applied thereto.

9. The display device of claim 3, wherein the first sound generator comprises:
    a bobbin disposed on the surface of the first substrate;
    a voice coil wound around the bobbin; and
    a magnet disposed on the bobbin and spaced apart from the bobbin.

10. The display device of claim 3, wherein each of the second sound generator and the third sound generator comprises
    a first electrode to which a first driving voltage is applied,
    a second electrode to which a second driving voltage is applied, and
    a vibration layer disposed between the first electrode and the second electrode and having a piezoelectric material which contracts or expands depending on the first driving voltage applied to the first electrode and the second driving voltage applied to the second electrode.

11. The display device of claim 8, wherein the second sound generator is disposed closer to one side of the display panel than the third sound generator is, and the third sound generator is disposed closer to an opposite side of the display panel than the second sound generator is.

12. The display device of claim 11, wherein the first sound generator is disposed closer to a center of the display panel than the second sound generator and the third sound generator are.

13. The display device of claim 3, further comprising:
a fourth sound generator which is disposed on the surface of the first substrate and vibrates the display panel according to a fourth sound signal to generate a fourth sound,
wherein the sound driver circuit generates the fourth sound signal from the second stereo signal to output the fourth sound signal to the fourth sound generator.

14. The display device of claim 13, wherein a sound pressure level of a fundamental tone of the fourth sound is less than a sound pressure level of a first harmonic tone of the fourth sound.

15. The display device of claim 13, wherein the sound driver circuit comprises:
a digital signal processor which reproduces a first high-frequency signal and a first low-frequency signal from the first stereo signal, reproduce a second high-frequency signal and a second low-frequency signal from the second stereo signal, generate a mono signal from the first stereo signal and the second stereo signal, generate a modulated low-frequency signal by modulating a low-frequency signal reproduced from the mono signal, generate a first modulated low-frequency signal by adding the modulated low-frequency signal to the first low-frequency signal, and generate a second modulated low-frequency signal by applying the modulated low-frequency signal to the second low-frequency signal;
a digital-to-analog converter which converts the first modulated low-frequency signal into the first sound signal, converts the first high-frequency signal into the second sound signal, converts the second high-frequency signal into the third sound signal and converts the second modulated low-frequency into the fourth sound signal; and
an amplifier which amplifies the first sound signal, the second sound signal, the third sound signal and the fourth sound signal and outputs amplified first to fourth sound signals.

16. The display device of claim 4, wherein digital signal processor comprises:
a first high-pass filter which filters a sound signal in a first high-frequency range from the first stereo signal to output the first high-frequency signal;
a second high-pass filter which filters a sound signal in the first high-frequency range from the second stereo signal to output the second high-frequency signal;
a first band-pass filter which filters a sound signal in a first low-frequency range from the first stereo signal to output a first low-frequency signal; and
a second band-pass filter configured filter a sound signal in the first low-frequency range from the second stereo signal to output a second low-frequency signal.

17. The display device of claim 16, wherein the digital signal processor further comprises:

a mono signal generator which generates the mono signal from the first stereo signal and the second stereo signal;
a low-pass filter which filters a sound signal in a second low-frequency range to output the low-frequency signal;
a low-frequency signal modulator which modulates the low-frequency signal so that a harmonic tone is generated based on a fundamental tone of the low-frequency signal to generate the modulated low-frequency signal;
a third high-pass filter which filters a sound signal in the first high-frequency range from the modulated low-frequency signal; and
a gain multiplier which applies a gain value to the modulated low-frequency signal filtered by the by the third high-pass filter and outputs a gained modulated low-frequency signal.

18. The display device of claim 17, wherein the digital signal processor further comprises:
a first low-frequency modulation output unit which applies the modulated low-frequency signal to which the gain value is applied to the first low-frequency signal to output a first modulated low-frequency signal; and
a second low-frequency modulation output unit which applies the modulated low-frequency signal to which the gain value is applied to the second low-frequency signal to output a second modulated low-frequency signal.

19. The display device of claim 17, wherein the first high-frequency range is above a first threshold frequency, the first low-frequency range is between a second threshold frequency and a third threshold frequency lower than the first threshold frequency, and the second low-frequency range is below the first threshold frequency.

20. The display device of claim 13, wherein each of the first sound generator and the fourth sound generator vibrates the display panel by generating a magnetic force using a voice coil, and
wherein each of the second sound generator and the third sound generator vibrates the display panel by a piezoelectric material which contracts or expands depending on a voltage applied thereto.

21. The display device of claim 20, wherein the first sound generator is disposed closer to one side of the display panel than the fourth sound generator is, and the fourth sound generator is disposed closer to an opposite side of the display panel than the first sound generator is, and
wherein the second sound generator is disposed closer to one side of the display panel than the third sound generator is, and the third sound generator is disposed closer to an opposite side of the display device than the second sound generator is.

22. The display device of claim 13, further comprising: a fifth sound generator which is disposed on the surface of the first substrate and vibrates the display panel according to a fifth sound signal to generate a fifth sound.

23. The display device of claim 22, wherein the sound driver circuit comprises:
a digital signal processor which reproduces a first high-frequency signal and a first low-frequency signal from the first stereo signal, reproduces a second high-frequency signal and a second low-frequency signal from the second stereo signal, generates a mono signal from the first stereo signal and the second stereo signal, and generates a modulated low-frequency signal by modulating a low-frequency signal reproduced from the mono signal;

a digital-to-analog converter which converts the modulated low-frequency signal into the first sound signal, convert the first high-frequency signal into the second sound signal, converts the second high-frequency signal into the third sound signal, converts the first low-frequency signal into the fourth sound signal and converts a second modulated low-frequency into the fifth sound signal; and an amplifier which amplifies the first sound signal, the second sound signal, the third sound signal, the fourth sound signal and the fifth sound signal to output amplified first to fifth sound signals.

24. The display device of claim 4, wherein digital signal processor comprises:

a first high-pass filter which filters a sound signal in a first high-frequency range from the first stereo signal to output the first high-frequency signal;

a second high-pass filter which filters a sound signal in the first high-frequency range from the second stereo signal to output the second high-frequency signal;

a first band-pass filter which filters a sound signal in a first low-frequency range from the first stereo signal to output a first low-frequency signal; and a second band-pass filter configured filter a sound signal in the first low-frequency range from the second stereo signal to output the second low-frequency signal.

25. The display device of claim 24, wherein the digital signal processor further comprises:

a mono signal generator which generates the mono signal from the first stereo signal and the second stereo signal;

a low-pass filter which filters a sound signal in a second low-frequency range to output the low-frequency signal;

a low-frequency signal modulator which modulates the low-frequency signal so that a harmonic tone is generated based on a fundamental tone of the low-frequency signal to generate the modulated low-frequency signal;

a third high-pass filter which filters a sound signal in the first high-frequency range from the modulated low-frequency signal; and a gain multiplier which applies a gain value to the modulated low-frequency signal filtered by the by the third high-pass filter to output a gained modulated low-frequency signal.

26. The display device of claim 22, wherein each of the first sound generator, the fourth sound generator and the fifth sound generator vibrates the display panel by generating a magnetic force using a voice coil, and wherein each of the second sound generator and the third sound generator vibrates the display panel by a piezoelectric material which contracts or expands depending on a voltage applied thereto.

27. The display device of claim 26, wherein a size of the first sound generator is larger than a size of the fourth sound generator and a size of the fifth sound generator.

28. The display device of claim 26, wherein the fifth sound generator is disposed closer to one side of the display panel than the fourth sound generator is, and the fourth sound generator is disposed closer to an opposite side of the display panel than the fifth sound generator is, and wherein the second sound generator is disposed closer to one side of the display panel than the third sound generator is, and the third sound generator is disposed closer to an opposite side of the display device than the second sound generator is.

29. The display device of claim 26, wherein the first sound generator is disposed closer to a center of the display panel than the second sound generator, the third sound generator, the fourth sound generator and the fifth sound generator are.

30. A method of driving a display device, the method comprising:

filtering a sound signal in a first high-frequency range from a first stereo signal to output a first high-frequency signal;

filtering a sound signal in the first high-frequency range from a second stereo signal to output a second high-frequency signal;

generating a mono signal from the first stereo signal and the second stereo signal;

filtering a sound signal in a low-frequency range from the mono signal to output a low-frequency signal;

modulating the low-frequency signal so that a harmonic tone is generated based on a fundamental tone of the low-frequency signal to generate a modulated low-frequency signal;

filtering a sound signal in the first high-frequency range from the modulated low-frequency signal; and applying a gain value to the modulated low-frequency signal filtered by a high-pass filter to output a gained modulated low-frequency signal.

* * * * *